(12) United States Patent
Davies

(10) Patent No.: US 11,899,155 B2
(45) Date of Patent: Feb. 13, 2024

(54) SYSTEM, METHOD AND APPARATUS FOR REDUCED WATER USAGE FOR FRACTURING HYDROCARBON WELLS WITH THREE-DIMENSIONAL IMAGING OF THE FORMATION FROM A SINGLE BOREHOLE

(71) Applicant: CENOVUS ENERGY INC., Calgary (CA)

(72) Inventor: Tim J. Davies, Calgary (CA)

(73) Assignee: Cenovus Energy Inc., Calgary (CA)

( * ) Notice: Subject to any disclaimer, the term of this patent is extended or adjusted under 35 U.S.C. 154(b) by 494 days.

(21) Appl. No.: 17/059,195

(22) PCT Filed: Jun. 7, 2019

(86) PCT No.: PCT/CA2019/050808
§ 371 (c)(1),
(2) Date: Nov. 25, 2020

(87) PCT Pub. No.: WO2019/232647
PCT Pub. Date: Dec. 12, 2019

(65) Prior Publication Data
US 2021/0199833 A1    Jul. 1, 2021

Related U.S. Application Data

(60) Provisional application No. 62/682,697, filed on Jun. 8, 2018.

(51) Int. Cl.
*G01V 1/50*    (2006.01)
*E21B 47/002*    (2012.01)
(Continued)

(52) U.S. Cl.
CPC ............... *G01V 1/50* (2013.01); *E21B 43/14* (2013.01); *E21B 43/26* (2013.01);
(Continued)

(58) Field of Classification Search
CPC . G01V 1/50; G01V 1/30; G01V 1/308; G01V 2210/00; G01V 2210/646; E21B 47/0025
See application file for complete search history.

(56) References Cited

U.S. PATENT DOCUMENTS 6,747,915 B2    6/2004 Calvert
7,819,805 B2    10/2010 Davies et al.
(Continued)

FOREIGN PATENT DOCUMENTS

CA    1130201    8/1982
WO    2015061305 A1    4/2015
(Continued)

OTHER PUBLICATIONS

Tang et al., Single-Well S-Wave Imaging Using Multicomponent Dipole Acoustic-Log Data, Nov.-Dec. 2009, Geophysics, vol. 74, No. 6, pp. WCA211-WCA223 (Year: 2009).*
(Continued)

*Primary Examiner* — Toan M Le
(74) *Attorney, Agent, or Firm* — Gordon & Jacobson, P.C.

(57) ABSTRACT

Provided are methods of reducing water consumption in a fracturing operation. The methods can include imaging a geologic formation surrounding a borehole using a downhole tool within the borehole. The method can further include identifying, within the image, fractures conducive to hydrocarbon production; correlating the fractures conducive to hydrocarbon production to fracture zones; and selecting locations of the fracture zones to be hydraulically fractured, wherein the selected locations collectively represent less than the axial length of the borehole, thereby reducing water consumption compared to hydraulic fracturing along an entirety of the axial length.

20 Claims, 23 Drawing Sheets

(51) Int. Cl.
    *E21B 43/14*      (2006.01)
    *E21B 43/26*      (2006.01)
    *E21B 49/00*      (2006.01)

(52) U.S. Cl.
    CPC .......... *E21B 47/0025* (2020.05); *E21B 49/00* (2013.01); *E21B 2200/20* (2020.05); *G01V 2210/00* (2013.01); *G01V 2210/646* (2013.01)

(56) References Cited

U.S. PATENT DOCUMENTS

| | | | |
|---|---|---|---|
| 8,665,667 | B2 | 3/2014 | He et al. |
| 8,923,092 | B2 | 12/2014 | Vu et al. |
| 2004/0044479 | A1 | 3/2004 | Sansone |
| 2008/0080308 | A1 | 4/2008 | Hornby |
| 2015/0013974 | A1 | 1/2015 | Mekic et al. |
| 2015/0109886 | A1* | 4/2015 | Mekic .................. G01V 1/284 367/25 |
| 2015/0129230 | A1 | 5/2015 | Carlson |
| 2017/0311048 | A1 | 2/2017 | Hilpert et al. |
| 2017/0247995 | A1 | 8/2017 | Crews et al. |
| 2020/0271807 | A1 | 8/2020 | Davies |

FOREIGN PATENT DOCUMENTS

| | | |
|---|---|---|
| WO | 2015084390 A1 | 6/2015 |
| WO | 2015168417 A1 | 11/2015 |
| WO | 2016040669 A1 | 3/2016 |
| WO | 2019071340 A1 | 4/2019 |

OTHER PUBLICATIONS

ISA/CA Canadian Intellectual Property Office—International Search Report and Written Opinion of the International Searching Authority for PCT international application No. PCT/CA2019/050808 Filed Jun. 7, 2019.

ISA/CA Canadian Intellectual Property Office—International Preliminary Report on Patentability for PCT international application No. PCT/CA2019/050808 Filed Jun. 7, 2019.

ISA/CA Canadian Intellectual Property Office—International Search Report and Written Opinion of the International Searching Authority for PCT international application No. PCT/CA2018/051266 Filed Oct. 9, 2018.

\* cited by examiner

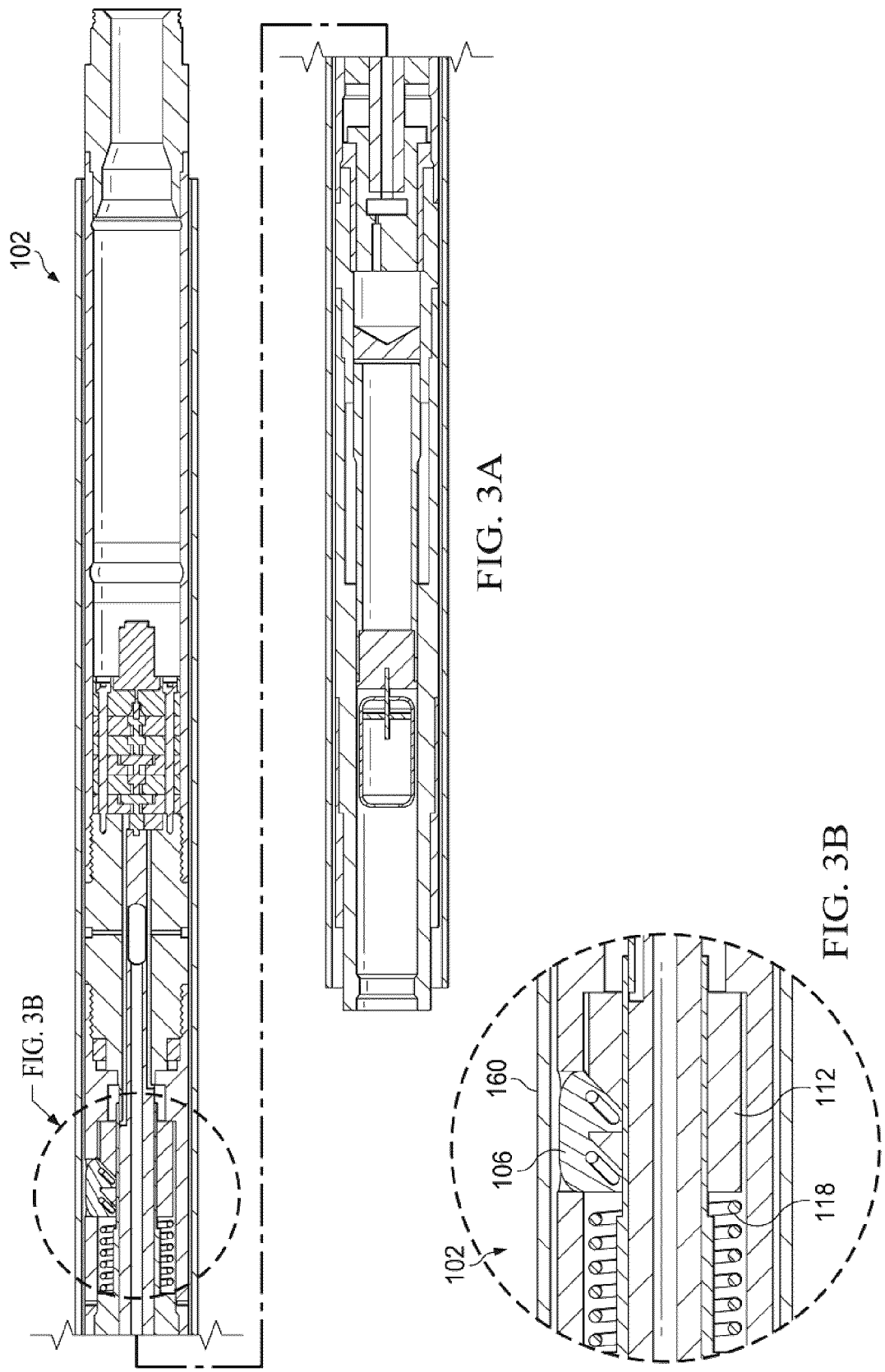

SYSTEM, METHOD AND APPARATUS FOR REDUCED WATER USAGE FOR FRACTURING HYDROCARBON WELLS WITH THREE-DIMENSIONAL IMAGING OF THE FORMATION FROM A SINGLE BOREHOLE

CROSS-REFERENCE TO RELATED APPLICATIONS

This application is a national stage application under 35 U.S.C. 371 and claims the benefit of PCT Application No. PCT/CA2019/050808 having an international filing date of Jun. 7, 2019, which designated the United States, and which PCT application claimed the benefit of and priority to U.S. Provisional Patent Application No. 62/682,697 filed on Jun. 8, 2018 The disclosures of the PCT application and the provisional application are incorporated herein by reference in their entirety.

TECHNICAL FIELD

The present invention relates generally to reducing water usage during fracturing operations by imaging of subsurface formations, and more particularly, to a system, method and apparatus for improved water usage for fracturing hydrocarbon wells with 3D acoustic imaging of the formation remote from a single borehole using a downhole tool within the borehole.

BACKGROUND

In the US oil and gas sector, water and sand or other proppants are used to crack open (e.g., fracturing or fracking) the rock formations to release the various forms of hydrocarbons. Current estimates are that about 15 million gallons of fresh water are used for each well. The 15 million gallons is divided into about 25 to 60 separate sections or stages that are positioned along the bore hole. The sections or stages are isolated from the rest of the well bore. Fracturing can require dozens of high-powered pumps. The pumps force water and sand into each small, sealed-off section or zone in the well and build up pressure in that section until the earth ruptures and the water and sand rush into the newly created fractures. The fluid pressure required can be up to about 15,000 psi, and the injection rate of the fluid can be on the order of a rate of 100 barrels per minute. In addition, the amount of sand required can be about 15,000 lbs. per foot of the well.

This technique can be extremely effective in recovering oil and gas that would otherwise not naturally flow. When the fractures have been formed, the well is then reverse-pumped and the frack water is recovered and sent for disposal. After the "clean up" of the well, the operator pumps out a combination of oil and water or gas. Given the large amount of water and other resources necessary for fracturing, improvements in fracturing technology to enable well operators to reduce water use continue to be of interest.

Three-dimensional imaging of subsurface features for the purpose of characterizing and identifying important properties of a formation has been the focus of research for some oil and gas industry service and production companies for the purpose of planning the most efficient/optimized approach to recovering valuable resources contained within the formations.

Vertical seismic profiling (VSP) is a technique of seismic measurements used for correlation with surface seismic data to get the seismic velocity and lithologic structure near the borehole. VSP has been used for small-scale seismic surveys, but such techniques can only determine properties of the formation closely surrounding (i.e., in close proximity to) the borehole.

There are several techniques that address some aspects of imaging a formation in a region remote from the borehole. For example, wave separation is an approach that separates the reflected acoustic waves into up-going and down-going waves. This technique is used to remove artifacts due to complex overburden encountered during conventional surface-based seismic surveys. Many so-called "virtual point source" methods assume that the real sources are located at the surface, and either the receivers are also located at the surface, or are located down-hole. In either example, a virtual point source may be located at the position of a physical receiver. Range-gating/time-gating and redatuming are typically used to position the virtual source at the location of the real receivers. There are other techniques that do not place the virtual source at the location of a real receiver, which utilize monopole and dipole sources that are typically used in logging tools, but these techniques require sources or receivers at the surface. These are sometimes referred to as single well reflection imaging and dipole shear wave imaging. Other solutions, such as cross-borehole tomography, require at least two boreholes, with the acoustic source in one borehole and receivers within an adjacent second borehole.

Improved techniques for generating three-dimensional images of a subsurface (i.e., subterranean) formation in a region remote from a single borehole continue to be of interest, to better determine the structure and properties of a formation, and to better delineate reservoirs and optimize resources, as well as recovery of valuable resources contained in the formation.

SUMMARY

The present invention provides improved methods for fracturing a hydrocarbon deposit. In an aspect, the disclosed methods reduce water usage during fracturing operations by imaging of subsurface formations.

In an embodiment, the present disclosure relates to a method of reducing water consumption in a fracturing operation, comprising: (i) imaging a geologic formation surrounding a borehole using a downhole tool within the borehole, the imaging along an axial length of the borehole within the geologic formation, and the imaging creates an image indicative of natural fractures within the geologic formation; (ii) identifying, within the image, fractures conducive to hydrocarbon production; (iii) correlating the fractures conducive to hydrocarbon production to fracture zones along the axial length, wherein each fracture zone spans a portion of the axial length, and collectively the fracture zones are less than the axial length; and (iv) identifying locations of the fracture zones to be hydraulically fractured, thereby reducing water consumption compared to hydraulic fracturing along an entirety of the axial length of the borehole within the geologic formation.

In an embodiment, the present disclosure relates to a method of reducing water consumption for fracturing a geologic formation surrounding a borehole, the method comprising: (i) imaging, using a downhole tool within the borehole, the geologic formation surrounding the borehole to obtain imagery of the geologic formation along a certain extent of the borehole; (ii) analyzing the imagery to identify certain zones based on features in the geologic formation revealed by the imagery, the analyzing of the imagery results in identified zones; (iii) identifying natural fractures in the geologic formation within the identified zones, the identifying results in identified fractures; (iv) selecting regions in the borehole based upon the identified fractures to create selected regions, wherein the selected regions collectively represent less than the certain extent of the borehole; and (v) determining one or more individual fracturing locations corresponding to each selected region, so that fracturing the borehole at each respective fracturing location, without fracturing elsewhere along the certain extent of the borehole, results in fracturing only the selected regions of the borehole, thereby reducing water consumption during fracturing operation.

In an embodiment, the present disclosure relates to a method of fracturing a hydrocarbon deposit, comprising: (i) imaging a geologic formation surrounding a borehole using a downhole tool within the borehole, the imaging along an axial length of the borehole within the geologic formation, and the imaging creates an image indicative of natural fractures within the geologic formation; (ii) identifying, within the image, fractures conducive to hydrocarbon production; (iii) correlating the fractures conducive to hydrocarbon production to fracture zones along the axial length, wherein each fracture zone spans a portion of the axial length, and collectively the fracture zones are less than the axial length; and (iv) hydraulic fracturing one or more of the fracture zones and refraining from hydraulic fracturing at least some remaining zones outside the fracture zones.

BRIEF DESCRIPTION OF THE DRAWINGS

For a more complete understanding of the present disclosure and its advantages, reference is now made to the following description taken in conjunction with the accompanying drawings.

FIG. 3 is a side view of an embodiment of an anchor tool showing dogs in an unlocked position.

Figure 1:
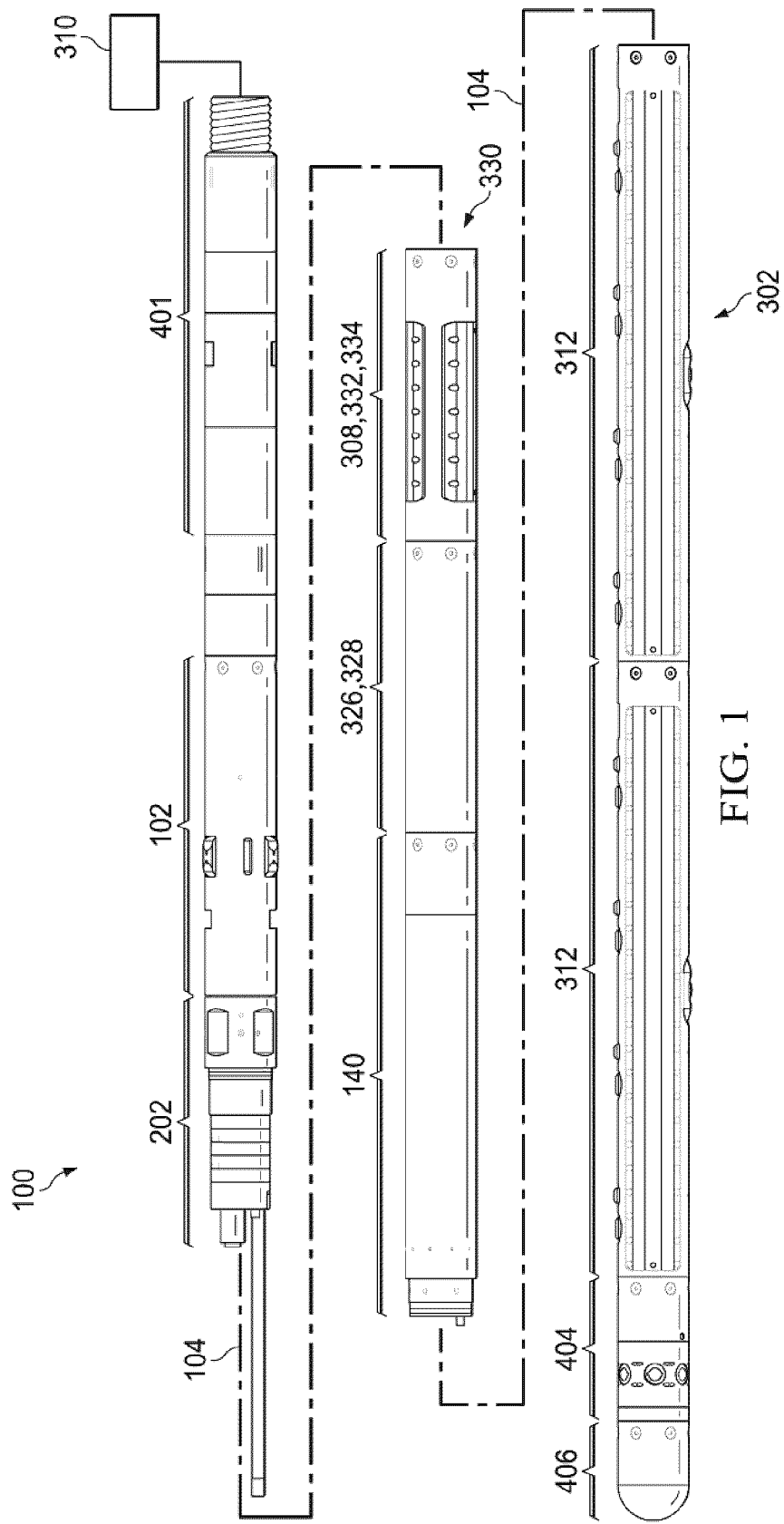
FIG. 1 is a side view of an embodiment of a downhole tool assembly.

The use of the same reference symbols in different drawings indicates similar or identical items. It should be understood that the specific embodiments shown in the drawings and described in the detailed description do not limit the disclosure. On the contrary, they provide the foundation for one of ordinary skill to discern the alternative forms, equivalents and modifications that are encompassed in the scope of the appended claims.

Definitions

Various terms are used to refer to particular system components. Different companies may refer to a component by different names—this document does not intend to distinguish between components that differ in name but not function.

"Virtual point source" shall mean a volume within a formation where no borehole exists, and from which acoustic energy propagates. An interface of rock formations having different densities, and from which acoustic energy reflects, shall not be considered a virtual point source.

"Sending a signal having two distinct frequencies" shall mean the signal is the superposition of the two (or more) distinct frequencies. Sending a signal of a single frequency that can be approximated as superposition of multiple signals each having its own distinct frequency (e.g., Fourier Series, Taylor Series), shall not be considered sending a signal having two distinct frequencies.

The term "communicate," as well as derivatives thereof, encompasses both direct and indirect communication.

The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C; A and B; A and C; B and C; A; B; and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, no distinction is intended between a subsurface formation and a subterranean formation.

DETAILED DESCRIPTION

The present invention provides improved methods for fracturing a geologic formation, such as a hydrocarbon deposit. In an aspect, the disclosed methods reduce water usage during fracturing operations by imaging of subsurface formations.

A hydrocarbon well can be characterized by a production profile of the performance of the well. It is not uncommon for about a third of the stages (fracked sections) to produce substantially no oil. An additional 30% to 40% of the well can produce a limited amount of oil, but at very low flow rates that do not substantially add to the value of the well. Thus, only about a fourth or a third of the stages of a conventional well produce most (e.g., about 75% to 80%) of the total oil produced by the well. This means that up to about 70% of the frac stages are not needed and, in fact, are a waste of water and other resources.

The methods and associated embodiments disclosed herein can provide the operator with a more accurate understanding about where natural fractures are located relative to the wellbore and deep into the formation. The term, "natural fractures" can include organic, non-man-made fractures that can be further expanded to allow the hydrocarbons to flow. Natural fractures can enhance the effective permeability of geologic formations by connecting pores together. As used herein, "natural fractures" are distinguished from fractures that are induced as part of a stimulation or drilling operation.

Embodiments of the information that can be provided to the operator by the disclosed methods can include data, images, etc., that help distinguish the target natural fractures from less desirable areas. By "target natural fractures", it is meant the natural fractures identified as conducive to hydrocarbon production. The methods disclosed herein can identify where to frac and, conversely, where not to frac to more carefully plan the fracturing procedure (e.g. to optimize resources). In particular, the disclosed methods can allow for targeting specific sections or stages of the well for the fracturing procedure and can reduce the amount of water and sand required. For example, a well that requires only a fourth of the typical number of stages (e.g., 15 stages instead of 60 stages, or 5 stages instead of 20 stages), can reduce water consumption and provide far superior results than what is permissible with the traditional approach to fracturing wells.

In one example, the cost per stage can be approximately $40,000 for the fracturing crew, etc., and can be about $40,000 per stage for water, chemicals, trucking, etc. On a 50-stage well, the cumulative cost can be about $4 million for fracturing, and the total cost of the well can be in a range of about $6 million to 8 million. If the number of frac stages could be reduced by about 30%, (e.g., 35 stages instead of 50 stages), there would be a water use reduction of about 4.5 million gallons, and a cost savings of about $1.2 million per well on direct frac cost reduction. If the number of frac stages could be reduced by about 60%, there could be a water reduction of about 9 million gallons, and a cost savings of about $2.4 million per well.

Another benefit of the methods disclosed herein is that the well will no longer be producing formation water from the fractures that did not penetrate the formation. This is expected to save several thousand barrels of disposal water per day, per well. Currently, the US disposes of about 65 million barrels of used frac water every day. In addition, the injection of this water through either direct fracturing or water disposal has been linked to increasing seismicity (particularly in Oklahoma and Texas), wherein earthquakes having a magnitude of 3.0 to 4.0 are common. The embodiments disclosed herein make the wells more economic and as such, lead to increased profits for the operators as well as greatly reduced water consumption/disposal requirements for society and industry.

Methods of Fracturing

In this section herein, methods of the present disclosure are described, with a more comprehensive description of the imaging and other techniques following in a separate section.

In an embodiment, the present disclosure relates to a method of reducing water consumption in a fracturing operation, comprising:

imaging a geologic formation surrounding a borehole using a downhole tool within the borehole, the imaging along an axial length of the borehole within the geologic formation, and the imaging creates an image indicative of natural fractures within the geologic formation;

identifying, within the image, fractures conducive to hydrocarbon production;

correlating the fractures conducive to hydrocarbon production to fracture zones along the axial length, wherein each fracture zone spans a portion of the axial length, and collectively the fracture zones are less than the axial length; and identifying locations of the fracture zones to be hydraulically fractured, thereby reducing water consumption compared to hydraulic fracturing along an entirety of the axial length of the borehole within the geologic formation.

In an embodiment, the present disclosure relates to a method of reducing water consumption for fracturing a geologic formation surrounding a borehole, the method comprising:

imaging, using a downhole tool within the borehole, the geologic formation surrounding the borehole to obtain imagery of the geologic formation along a certain extent of the borehole;

analyzing the imagery to identify certain zones based on features in the geologic formation revealed by the imagery, the analyzing of the imagery results in identified zones;

identifying natural fractures in the geologic formation within the identified zones, the identifying results in identified fractures;

selecting regions in the borehole based upon the identified fractures to create selected regions, wherein the selected regions collectively represent less than the certain extent of the borehole; and determining one or more individual fracturing locations corresponding to each selected region, so that fracturing the borehole at each respective fracturing location, without fracturing elsewhere along the certain extent of the borehole, results in fracturing only the selected regions of the borehole, thereby reducing water consumption during fracturing operation.

In an embodiment, the present disclosure relates to a method of fracturing a hydrocarbon deposit, comprising:

imaging a geologic formation surrounding a borehole using a downhole tool within the borehole, the imaging along an axial length of the borehole within the geologic formation, and the imaging creates an image indicative of natural fractures within the geologic formation;

identifying, within the image, fractures conducive to hydrocarbon production;

correlating the fractures conducive to hydrocarbon production to fracture zones along the axial length, wherein each fracture zone spans a portion of the axial length, and collectively the fracture zones are less than the axial length; and hydraulic fracturing one or more of the fracture zones and refraining from hydraulic fracturing at least some remaining zones outside the fracture zones.

The imaging of the geologic formation may be performed by using any of the imaging techniques as described herein, including any combination thereof.

By "geologic formation" it is meant any subterranean formation in which hydrocarbons are contained. The formation may include one or both of a low-permeability or high-permeability hydrocarbon-bearing formation. Low-permeability formations—those having permeabilities of less than about 10 mD—include but are not limited to shale formations, tight sandstone formations, and coal bed formations. "Shale" is a fine-grained sedimentary rock that forms from the compaction of silt and clay-size mineral particles.

High-permeability formations—those having permeabilities of greater than about 10 mD—include but are not limited to those that are sand-dominated and that have sand facies. Sand-dominated formations may have permeabilities ranging from 1,000 mD to 10,000 mD (1 to 10 D). The hydrocarbons contained in high-permeability formations may be viscous hydrocarbon. Viscous hydrocarbons may be referred to as reservoirs of heavy hydrocarbons, heavy oil, bitumen, or oil sands.

In an embodiment, the geologic formation is comprised of oil sands, shale, sandstone, limestone, coal, or any combination thereof. In a particular embodiment, the geologic formation is a shale formation. In another particular embodiment, the geologic formation is oil sands. In such embodiments where the geologic formation is comprised or consists of oil sands, the methods disclosed herein may be used or applied in association with steam-assisted gravity drainage (SAGD) oil recovery technologies and processes. In situ processes for recovering hydrocarbons from oil sands typically involve the use of multiple wells. Such processes are often assisted or aided by injecting a fluid (e.g. steam, solvent, or a combination thereof) through an injection well to mobilize the viscous hydrocarbons for recovery through a production well. SAGD and cyclic steam stimulation (CSS) are two such processes (see, e.g.: Butler, Roger (1991), Thermal Recovery of Oil and Bitumen, Englewood Cliffs: Prentice-Hall).

A typical SAGD process is disclosed in Canadian Patent No. 1,130,201, in which two wells are drilled into a hydrocarbon-bearing formation. One of the wells is configured for steam (i.e. an injection well) and the other is configured for the production of oil and water (i.e. a production well). In operation, steam injected via the injection well heats formation and condenses to an aqueous condensate. The transfer of latent heat from the steam to the formation heats the viscous hydrocarbons which increases their mobility. After sufficient heat transfer, the viscous hydrocarbons are sufficiently-mobilized to drain under the influence of gravity toward the production well with an aqueous condensate. In this way, the injected steam creates a "steam chamber" in the formation around and above the injection well. The term "steam chamber" accordingly refers to a volume of the reservoir from which mobilized hydrocarbons have at least partially drained. Mobilized hydrocarbons are recovered continuously through the production well. The conditions of steam injection and of hydrocarbon production may be modulated to control the growth of the steam chamber.

In the context of the present application and the methods herein, imaging and fracturing may from the injection well, the production well, or a combination thereof. In an embodiment, the imaging and fracturing are from the same well. Alternatively, the imaging may be from one well (an injection or a production well) and the fracturing may be from the opposite type of well (an injection well when imaging from production well or a production well when imaging from injection well).

As used herein, the term "borehole" alone refers to a physical or actual borehole that has been drilled in the geologic formation. This is distinguished from a "virtual borehole" as described elsewhere herein. The borehole may be horizontal, vertical, or a combination thereof. The "axial length" of the borehole is any distance along the length of the borehole which may be used for stimulation operations, such as fracturing. In an embodiment, the imaging may be of a certain, select portion of the axial length, interchangeably referred to herein as a "certain extent of the borehole". In another embodiment, the imaging may be of the entire axial length. The imaging, employed as described herein, creates an image depicting natural fractures within the geologic formation, and thus is an image indicative of natural fractures.

Exemplary embodiments and techniques of imaging the geologic formation, using the techniques described in greater detail elsewhere herein, are now described. FIGS. 23-27 illustrate an example of a water saving, sub-surface imaging process flow sequence produced in accordance with the embodiments disclosed herein. In particular, these images depict how fractures in a well can be mapped (in one version) with the equipment described herein to reduce the amount of water consumed by fracturing. As is known in the art, fracturing is the process of injecting materials, such as liquids and proppants, at high pressure into subterranean formations to open or further open existing fractures in order to extract hydrocarbons.

In these drawings, the image of the formation surrounding the well is shown in a horizontal configuration on the page, but could be vertical, diagonal, or extend in still other directions. In this example, the same base image is shown in each of FIGS. 23-27, but is edited, enhanced, etc., based on the imaging process.

Figure 23:
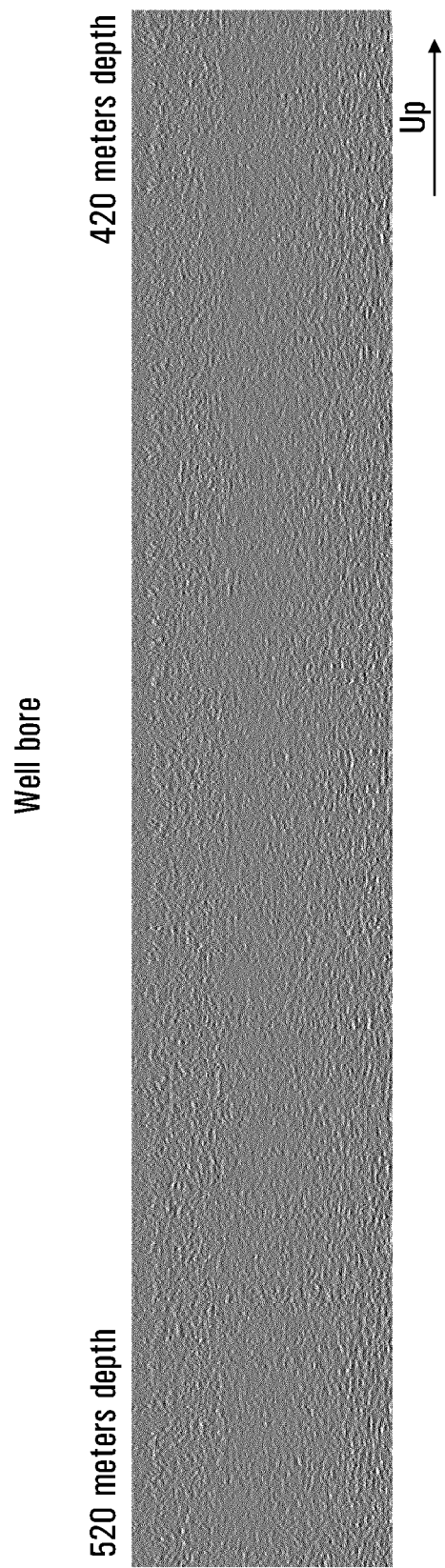
FIGS. 23-27 are schematic renderings of images of the formation surrounding a borehole and configured in accordance with the embodiments disclosed herein.

FIG. 23 depicts an embodiment of an image of a geologic formation that surrounds a well. The image is formed by the embodiments disclosed herein. In this illustration, numerous images (e.g., 50+ images) are collected in various radial directions relative to the axis of the well and joined or stitched together to form the consolidated image shown. This image represents an approximately 360 degree view of the formation surrounding the well. In this embodiment, the left to right length (or depth) of the well is about 100 meters (e.g., from about 420 meters in depth, to about 520 meters in depth), and the radial width of the image is from the well to about 50 meters away from the well in the radial direction.

Figure 24:
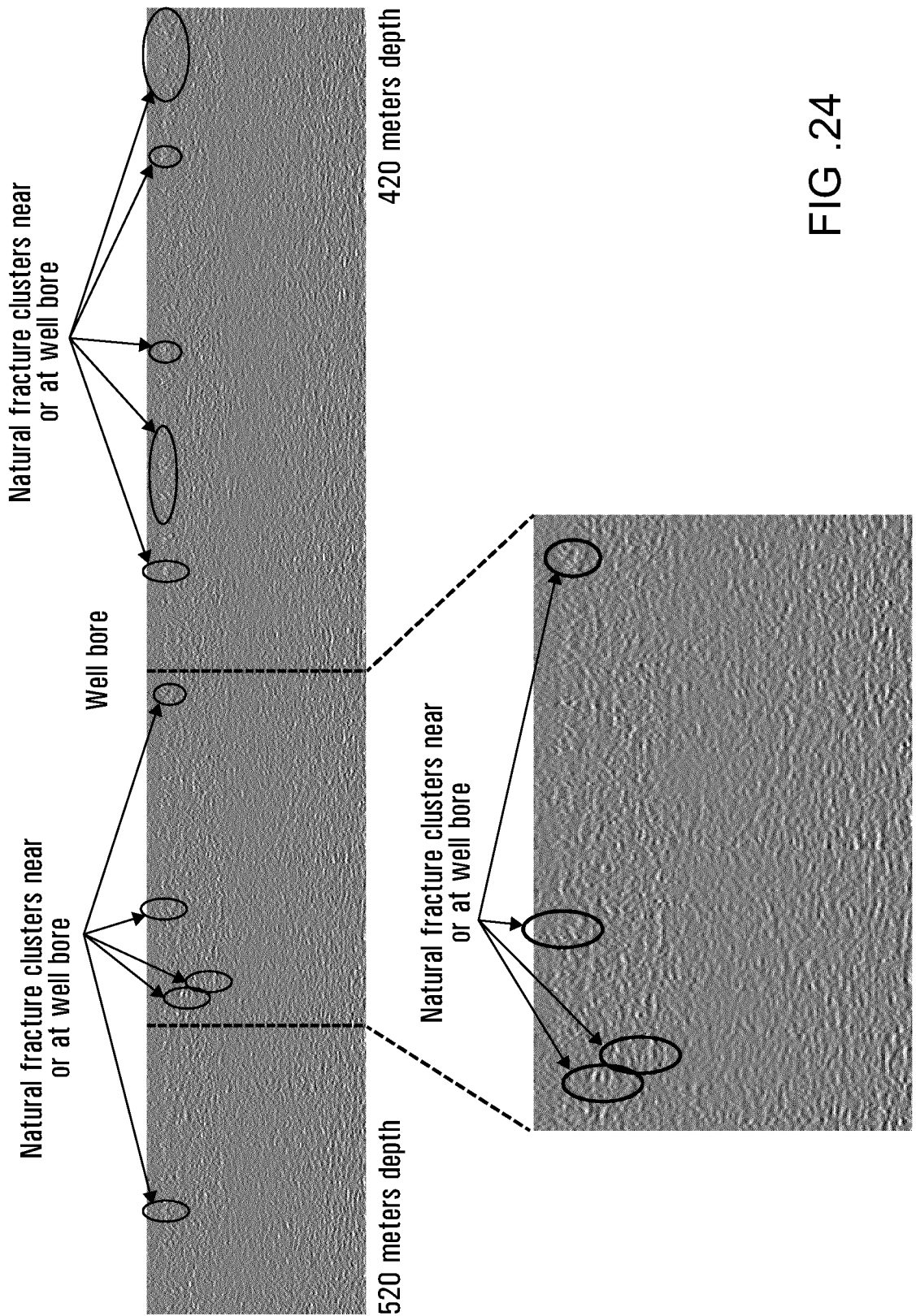

Exemplary embodiments and techniques of identifying fractures conducive to hydrocarbon production are now described. In the embodiment of FIG. 24, the image of FIG. 23 is shown, but only some formation zones (e.g., the ovals referenced by the arrows) have been selected and indicated based on features in the formation revealed by the image. The zones that are selected in FIG. 24 are chosen with various criteria, including the appearance in the image of multiple short parallel lines. The multiple short parallel lines are a diffraction indicator. Natural fractures or induced fractures (if any) can be imaged in parallel lines.

In some versions, the presence of bright spots in the selected zones also is a factor in the selection of the zones. The bright spots can be both a pure reflective response and a spectral signature of fractures. In ultrasonic imaging, the formation can be characterized as multiple zones, each corresponding to a change in the sensed image, where the changes appear as either a spectrum response (e.g., different frequencies) than the host formation, or pure reflective amplitude (e.g., stronger or weaker reflection). Although the zones indicated in FIG. 24 were selected manually, the selection of the zones can be fully automated, such as with an artificial intelligence (AI) algorithm. For example, this process can be based on a technique known as cartesian genetic programming. See, e.g., GECCO 2012 Tutorial: Cartesian Genetic Programming, GECCO '12 Companion, Jul. 7-11, 2012, by Julian F. Miller and Simon L. Harding, which tutorial is hereby incorporated by reference herein.

Figure 25:
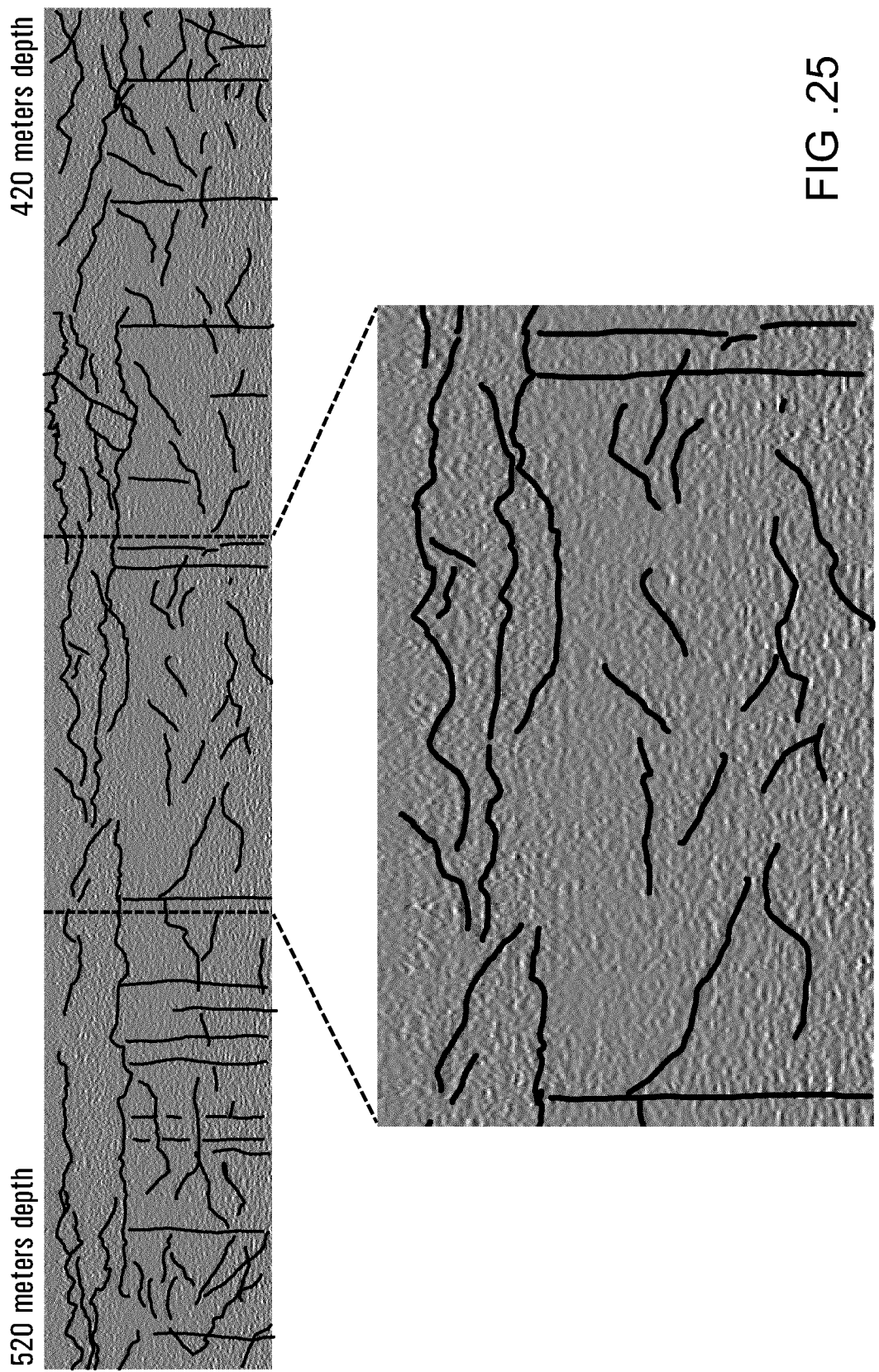

FIG. 25 depicts natural fractures identified in the formation with various types of "lines", as shown. The lines can be substantially linear, non-linear and/or irregular, as shown. The lines can be identified and indicated based on the zones identified in FIG. 24. Although the lines are manually identified in the example illustrated, the line identification process can be automated. The lines can be identified through a spectral drop out, which can include the zone having low amplitude and the zone being frequency-consistent across the fracture line. In addition, the lines extend over several independent images. In the example shown, the image comprises 50 separate images. Any "line" that transitions more than a few inches (actual scale) can be a real target that is transitioning through the formation, as fractures are known to do. The fractures can differ in appearance due to the different properties in the rock formation. For example, rocks in the Permian Basin may fracture differently than in the Eagleford or Marcellus formations.

In an embodiment, identifying fractures conducive to hydrocarbon production comprises identifying fractures with prominent directions parallel to the borehole. Such fractures can be identified based on the types of lines shown in FIG. 25. More particularly, in an embodiment, identifying fractures conducive to hydrocarbon production comprises identifying clusters of fractures with prominent directions parallel to the borehole.

Figure 26:
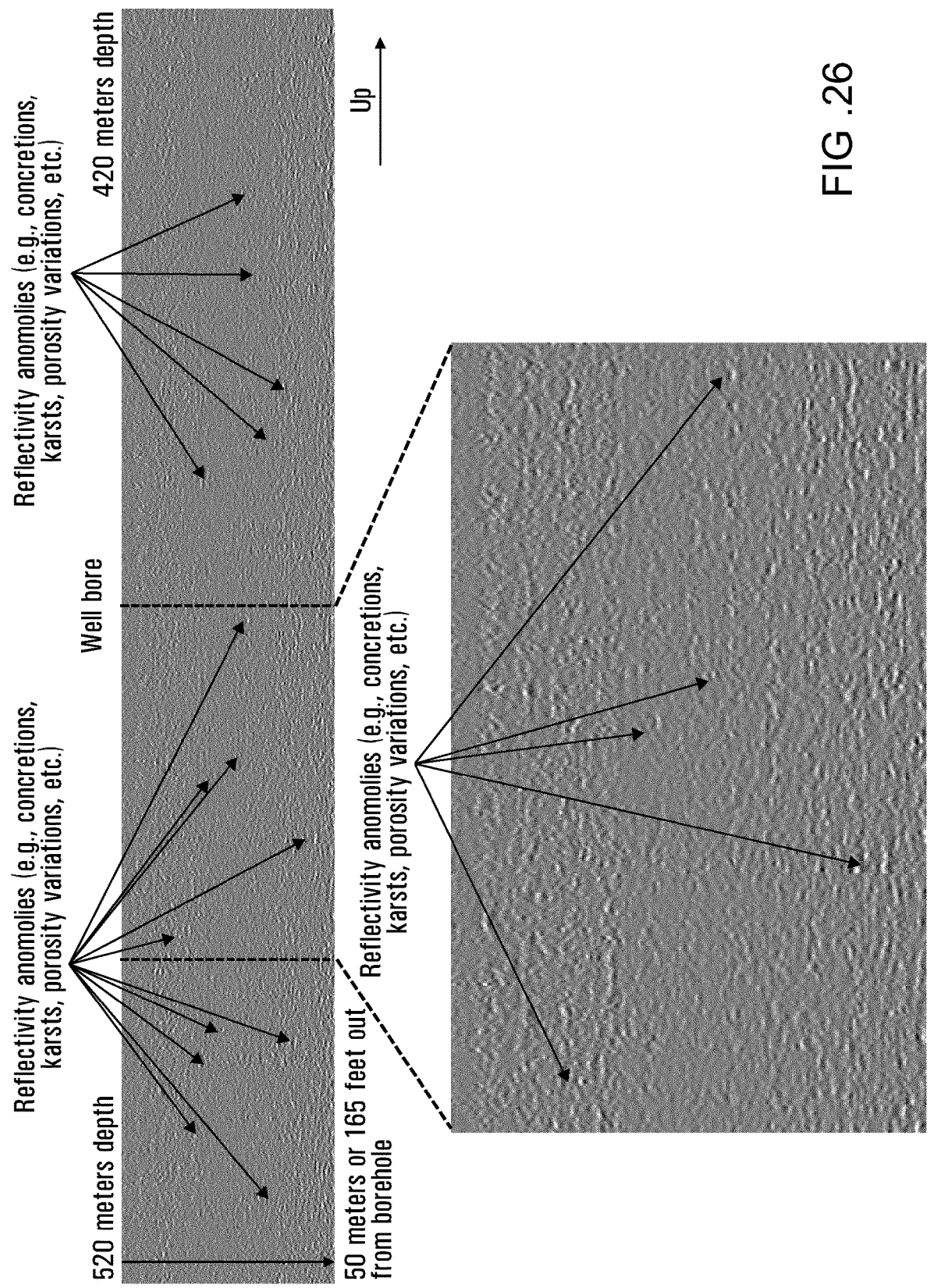

In FIG. 26, various locations in the formation are indicated with arrows based on reflective anomalies, such as concretions, karsts, porosity variations, etc. These locations were selected since they appear to be isolated targets that are not connected with other features. These isolated targets indicate a discrete change in the reflective properties of the formation, which can be attributed to one or more of a variety of reasons. One of the most common reasons can be a change in the pore properties of the formation. Another reason for the discrete changes in the reflective properties of the formation is a kind of porosity that is known as induced porosity, which is also known as vugs. Vugs can form in reefs and zones that have had fluid alter the native formation, and again they stand out from the surrounding formation due to their apparent isolation.

Exemplary embodiments and techniques of correlating fractures conducive to hydrocarbon production with "fracture zones" are now described, together with techniques to identify locations of the fracture zones to be hydraulically fractured. As used herein, the term "fracture zone" refers to a region of the geologic formation along the axial length of the wellbore that is identified as containing natural fractures conducive to hydrocarbon production. A fracture zone is distinguished from a non-fracture zone. Although a non-fracture zone may contain some fractures conducive to hydrocarbon production, the fracture zone is identified according to the methods herein as being more conducive to optimizing stimulation operations (such as fracturing) and thereby reducing consumption of water and other resources. Collectively, the identified fracture zones are less than the entire axial length. Within the fracture zones there will be optimal locations for fracturing to maximize oil and gas production from the well. These locations may be identified by the methods disclosed herein.

Figure 27:
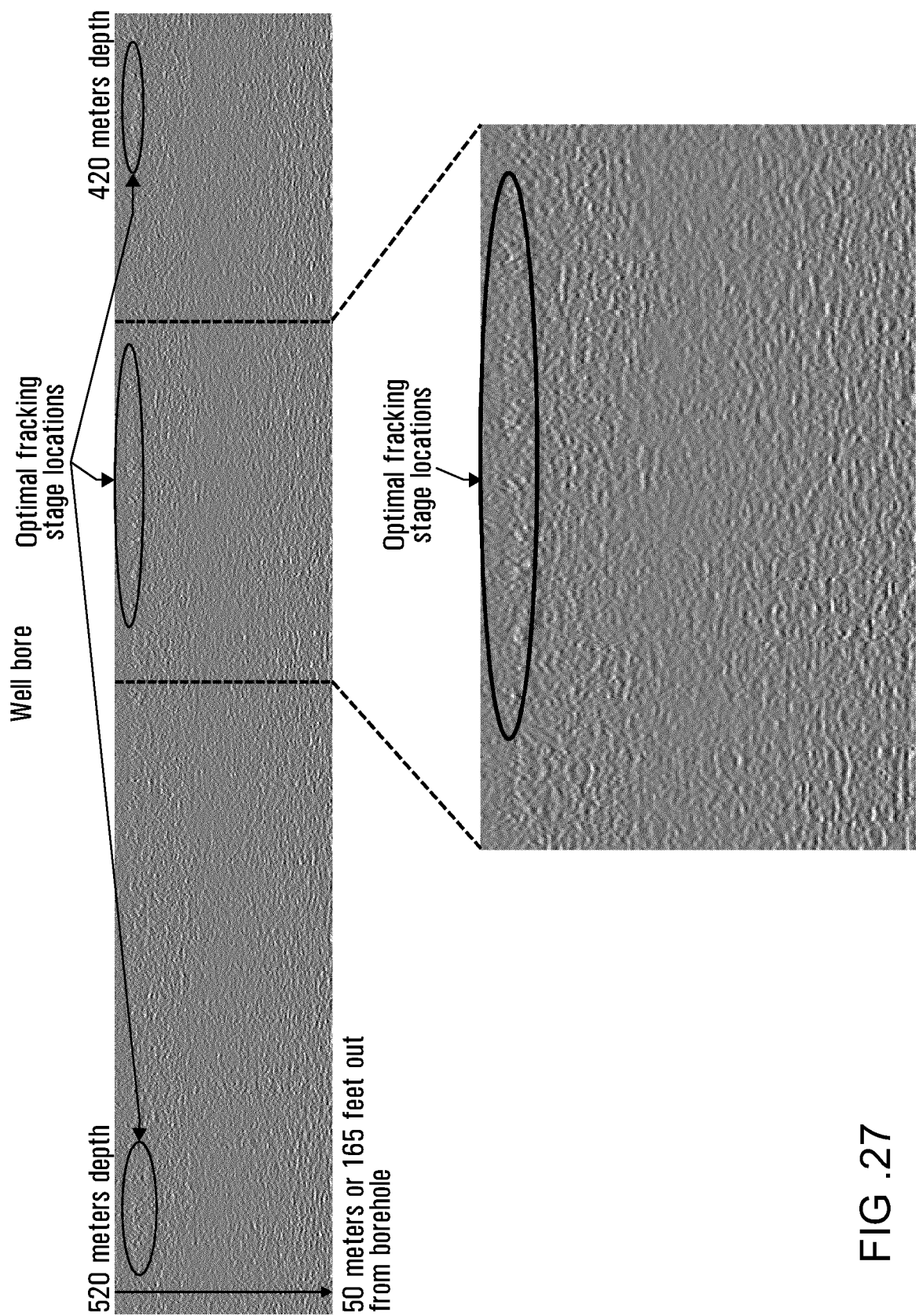

FIG. 27 is based on a review of FIGS. 24-26. In FIG. 27, several regions are indicated with arrows and ovals demonstrating a more significant concentration of near well bore fractures. The ovals selected cover about 20 meters each and, as such, represent common fracturing spacings. In some embodiments, not every region of the well bore is selected or fracked, such that some selected regions are not immediately adjacent to each other in the well bore.

In the example illustrated in FIG. 27, three locations are selected rather than the conventional numerous locations or continuous segments (e.g., in this example there would have been about 10 or so locations), that would normally have been fracked. In this version, the regions or zones selected are sufficiently connected so that fracturing these selected, connected zones will result in break through between those zones and give a much greater degree of connectedness in each particular zone. In those zones selected, there is a significant amount of spectral response, particularly with the multiple lines, indicating natural or otherwise existing fractures. The selected zones are connected in a manner that will flow more oil and gas than the zones that are not so well connected. The connectedness of the fractures can provide acoustic signatures that can be detected in the manner described.

The identification of locations of the fracture zones to be hydraulically fractured may be performed by way of a computer interface device. Indeed, identifying the locations for fracturing can be fully automated, such as with an artificial intelligence (AI) algorithm, and implemented by way of computer interface device. In an embodiment, the computer interface device is within the downhole tool and thus improves the functionality of the tool itself in performing its imaging function, e.g. by negating the need for transmissions to the surface. Having the computer interface device within the downhole tool can also improve the functionality of the methods described herein. In an embodiment, the computer interface device within the downhole tool may also assist in aligning and properly locating the fracturing tool.

In an embodiment of the methods disclosed herein, all of the identified fracture zones are subsequently fractured, and they may be fractured at one or more locations. In an embodiment, each of the fracture zones are fractured at one location along the axial length. In another embodiment, one or more, but not all of the fracture zones, are subsequently fractured. In an embodiment, none of the non-fracture zones are fractured (i.e. hydraulic fracturing is only within the fracture zones). In an embodiment, only some of the non-fracture zones are not fractured.

In some embodiments, the methods disclosed herein further comprise identifying, within the image, fractures that are non-conducive to hydrocarbon production; and correlating the fractures that are non-conducive to hydrocarbon production to non-fracture zones. In such embodiments, each non-fracture zone will span a portion of the axial length, and collectively the non-fracture zones will be less than the entire axial length.

Several other techniques can be employed for these systems, processes and methods disclosed herein. For example, spectral decomposition may be employed. Spectral decomposition can include breaking down the entire signal produced into its independent frequency components. Eigen cubes and steerable pyramids can be used. These techniques isolate similarities and differences in acoustic data, and a multitude of attributes determine the uniqueness of each formation. As an example, the AI can train on a library of data that is manually derived. A fracture zone can be manually selected and described for its unique attributes as to why it was selected and other zones were not selected. The result is an equation for that particular target. After several iterations, the system can become self-adaptive, and the result can be used as a filter in the image processing. These systems and techniques are enhanced with the raw acoustic data that is collected, which supplements the information that can be derived from the images generated.

Mapping the fractures around the well bore using the embodiments disclosed herein can provide insight about where to frac along a wellbore based on the images provided by the equipment. The natural fractures can also be imaged around neighboring wells, such as water disposal wells, to better map the local fractures. In addition, the growth of fractures in a well can be monitored over time by running the tool into the well at regular intervals of time, or by leaving the tool in the well and monitoring the progression of fractures over time. Such monitoring and guidance can be provided over time to enhance the safety of the well and of the overall region around the well.

The embodiments disclosed herein can be suitable for various hydrocarbon usages, such as applications in steam assisted gravity drainage (SAGD) and cyclical cycle steam injection and recovery. Examples include the heavy oil sectors in the Middle East, Mexico, Canada, etc.

Some versions can employ a short range calibration imager (relative to the borehole) that calibrates the near field around the borehole, and/or can provide case bond examination. The short range calibration imager can be built into the embodiments of the systems and tools described herein, or it can be run separately to calibrate the outgoing pulse generated by the system or tool. Such data can be used to image and inspect the casing, cement job surrounding the borehole, etc. This example can allow other portions of the equipment disclosed herein to focus on longer range imaging away from the borehole.

Other embodiments of the methods disclosed herein are contemplated, and can include combinations thereof.

In some embodiments, imaging of the geologic formation can include the acquisition of information indicative of azimuthal directions of the natural fractures conducive to hydrocarbon production, with the azimuthal directions being relative to the axial length of the borehole. This information can be used to define a fracturing direction based on the azimuthal direction of the fractures, thereby further increasing the efficiency of fracturing operation (e.g. in comparison to fracturing in all azimuthal directions. Thus, identifying azimuthal directions of natural fractures can aid in correlating and identifying the fractures that are more conducive to hydrocarbon production. By fracturing in the determined direction, and refraining from fracturing in at least some other directions, fracturing operations can be optimized and consumption of water and other resources reduced.

In some embodiments, imaging of the geologic formation can include creating a plurality of virtual boreholes within the geologic formation surrounding the actual borehole. As described in greater detail elsewhere herein, the borehole tool can create and transmit acoustic waves into the formation and record reflection data from waves reflected off interfaces in the formation that are then returned to the tool in the same borehole. However, a virtual borehole can be created at a distance from the borehole containing the tool to delineate and more clearly define the formation rock and its properties without drilling more wells. By employing this technique, parameters and features between each virtual borehole and the actual borehole can determined by 3D imaging, and an image created that is indicative of natural fractures between each virtual borehole and the actual borehole. The virtual boreholes can be created at any selected distance from, and at any azimuth about the axis of, the actual borehole. This avoids the need to drill two separate boreholes to achieve imagery remote from one of the boreholes.

In an embodiment, creating a virtual borehole comprises inducing a plurality of virtual point sources along a line, the line being offset from the actual borehole, and the inducing being by the downhole tool within the borehole. This technique may be repeated to create a plurality of virtual boreholes. In an embodiment, the line for inducing the plurality of virtual point sources is parallel to the borehole. The step of inducing the plurality of virtual point sources can comprise, for each virtual point source, focusing acoustic energy on a volume within the geologic formation, the volume spaced away from the borehole, and the focusing creating an acoustic source within the volume.

In some embodiments, imaging of the geologic formation can include focusing a first outbound acoustic energy, launched from the downhole tool within the axial length of the borehole, on a volume within the geologic formation spaced away from the borehole. In an embodiment, the first outbound acoustic energy is created from an array of acoustic sources spaced along the downhole tool. The array of acoustic sources may be activated as a phased array to focus the first outbound acoustic energy.

In an embodiment, focusing of the first outbound acoustic energy can include sending, from each acoustic source in the array of acoustic sources, a signal having two distinct frequencies. In an embodiment, a beat frequency as between the two distinct frequencies is between 500 Hertz and 1500 Hertz. In a particular, embodiment, a beat frequency as between the two distinct frequencies is less than 1000 Hertz.

In another embodiment, focusing the first outbound acoustic energy can include sending, from a first plurality of sources of the array of acoustic sources spaced along the downhole tool, signals having a first frequency; and simultaneously sending, from a second plurality of sources of the array of acoustic sources spaced along the downhole tool, signals having a second frequency different than the first frequency. In an embodiment, a beat frequency as between the two distinct frequencies is between 500 Hertz and 1500 Hertz. In a particular, embodiment, a beat frequency as between the two distinct frequencies is less than 1000 Hertz.

The focusing of a first outbound acoustic energy will create a first virtual point source that generates a first return acoustic energy. This first return acoustic energy can be received at one or more seismic sensors of the downhole tool. In an embodiment, the first return acoustic energy is received by a plurality of seismic sensors of the downhole tool. An image can then be created based on the first return acoustic energy.

In one embodiment for a method using a downhole tool within a single borehole for imaging a geologic formation in a region remote from the single borehole, the method includes: focusing acoustic energy to create a virtual point source (VPS) at a first location in the formation remote from the borehole, using a plurality of phase controlled transducers of the downhole tool, to resonate the rock formation at the first VPS location; receiving signals, using a plurality of receivers of the downhole tool, from the resonating rock at the first VPS location in the formation; communicating the received signals to a processor; and determining, using the processor and the received signals, at least one parameter of the formation at the first VPS location.

In some embodiments, the method further includes varying the phase control of the plurality of transducers to cause the VPS to be supersonically repeatedly moved between the first location and a second location that is an offset distance from the first location, to create a shear wave in the formation at the first VPS location.

In some embodiments, the at least one parameter includes an elastic modulus of the formation.

In some embodiments, the offset distance is determined based upon at least one of the density of the rock, the speed of sound in the rock, the frequency of the transmitted acoustic wave, the amplitude of the transmitted acoustic wave, or the number of pulses of the transmitted acoustic wave.

In some embodiments, the method further includes: focusing acoustic energy to create a second VPS at a corresponding second location in the formation remote from the borehole, using the plurality of phase controlled transducers of the downhole tool, to resonate the rock formation at the second VPS location; receiving signals, using the plurality of receivers of the downhole tool, from the resonating rock at the second VPS location in the formation; and determining, using the processor and the received signals from the second VPS location, at least one parameter of the formation at the second VPS location, to thereby create an image of a virtual borehole including the first and second VPS locations.

In some embodiments, the method further includes: relocating the imaging tool to a different location within the borehole; creating additional virtual point sources (VPS's) at corresponding locations in the formation remote from the borehole; receiving corresponding signals, using the plurality of receivers of the downhole tool, from each of the additional VPS locations in the formation; and determining, using the processor and the received signals from each additional VPS location, at least one parameter of the formation at each additional VPS location, to thereby create an image of a virtual borehole including the first, second, and additional VPS locations.

Imaging & Other Techniques

Techniques for creating two-dimensional (2D) and three-dimensional (3D) images and acquiring data related to subsurface features and properties of a formation or region from near a borehole to a region remote from a borehole are disclosed. Such techniques reduce the costs of seismic surveys by acquiring seismic data without the huge expense and time required for conventional seismic acquisition methods. Such techniques are also employed in the methods disclosed herein to reduce water consumption during fracturing of a geologic formation surrounding a borehole.

Figure 18:
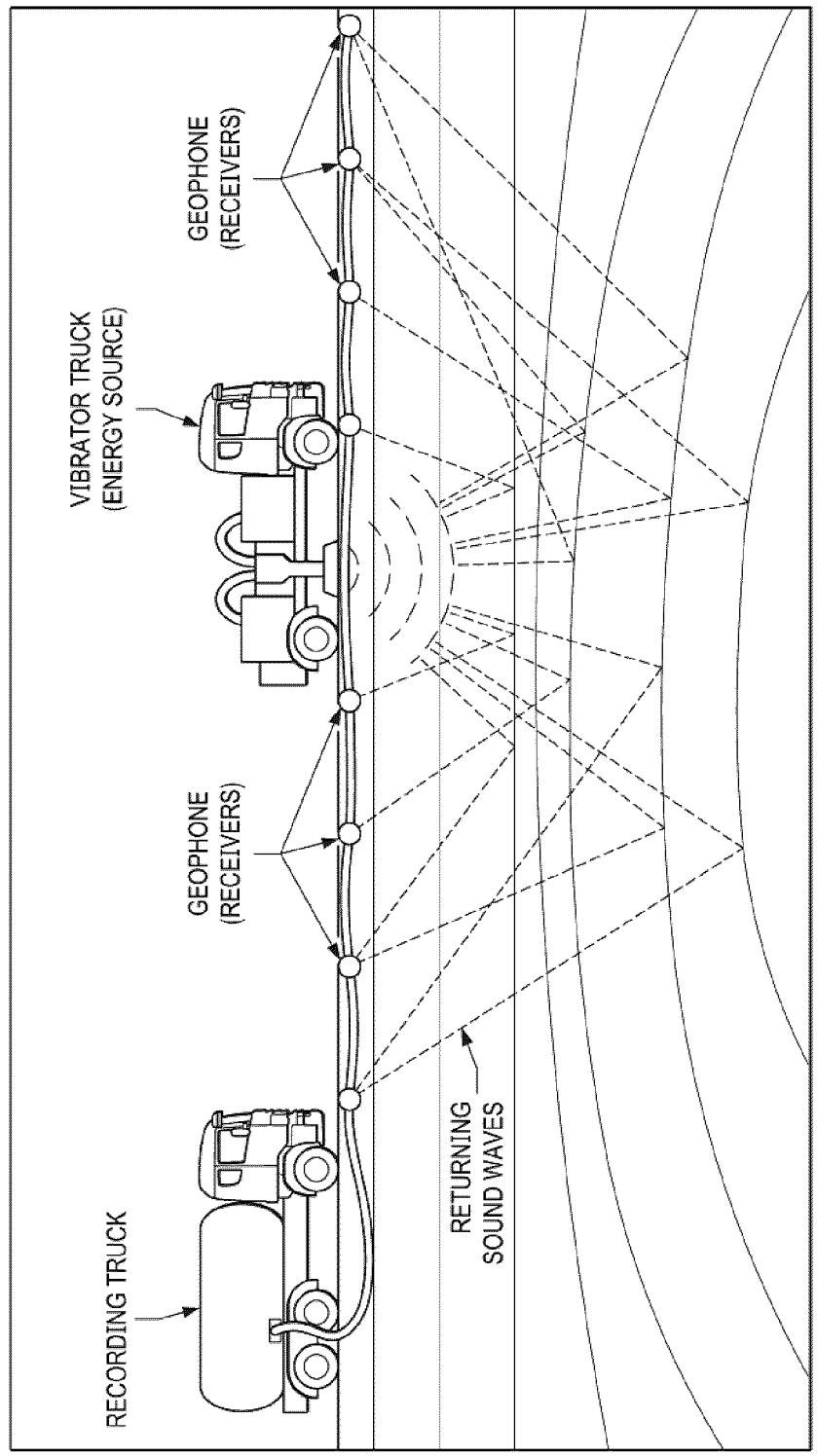
FIG. 18 is a schematic illustration of conventional seismic acquisition.
Figure 19:
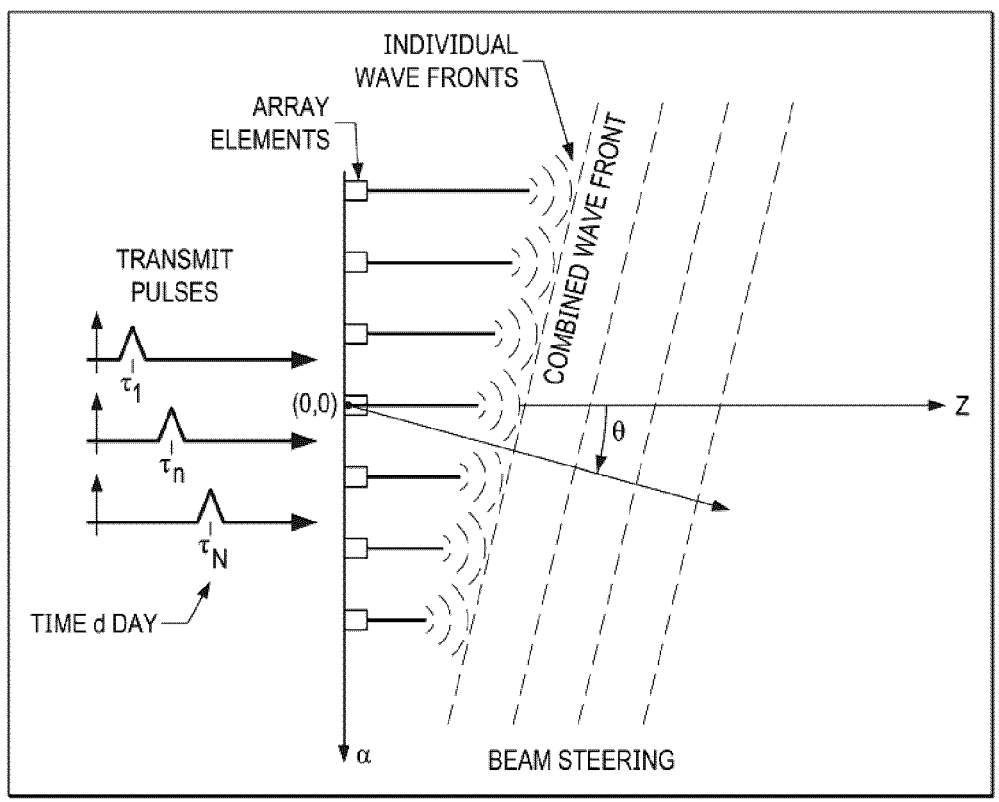
FIGS. 19-22 are schematic diagrams of embodiments of a tool body having an array of transducers and/or receivers that can be focused and/or steered using time delays.
Figure 20:
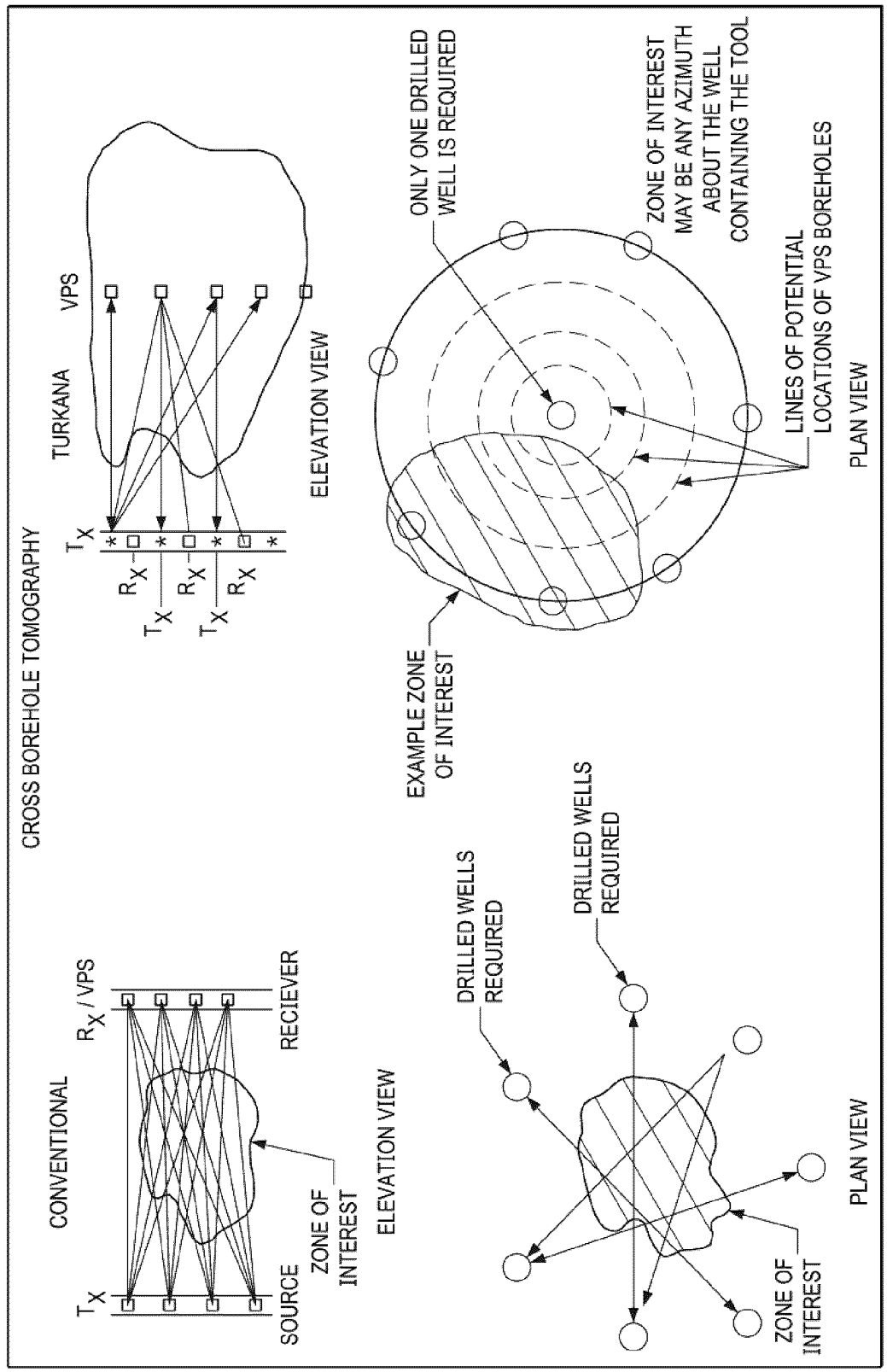
Figure 21:
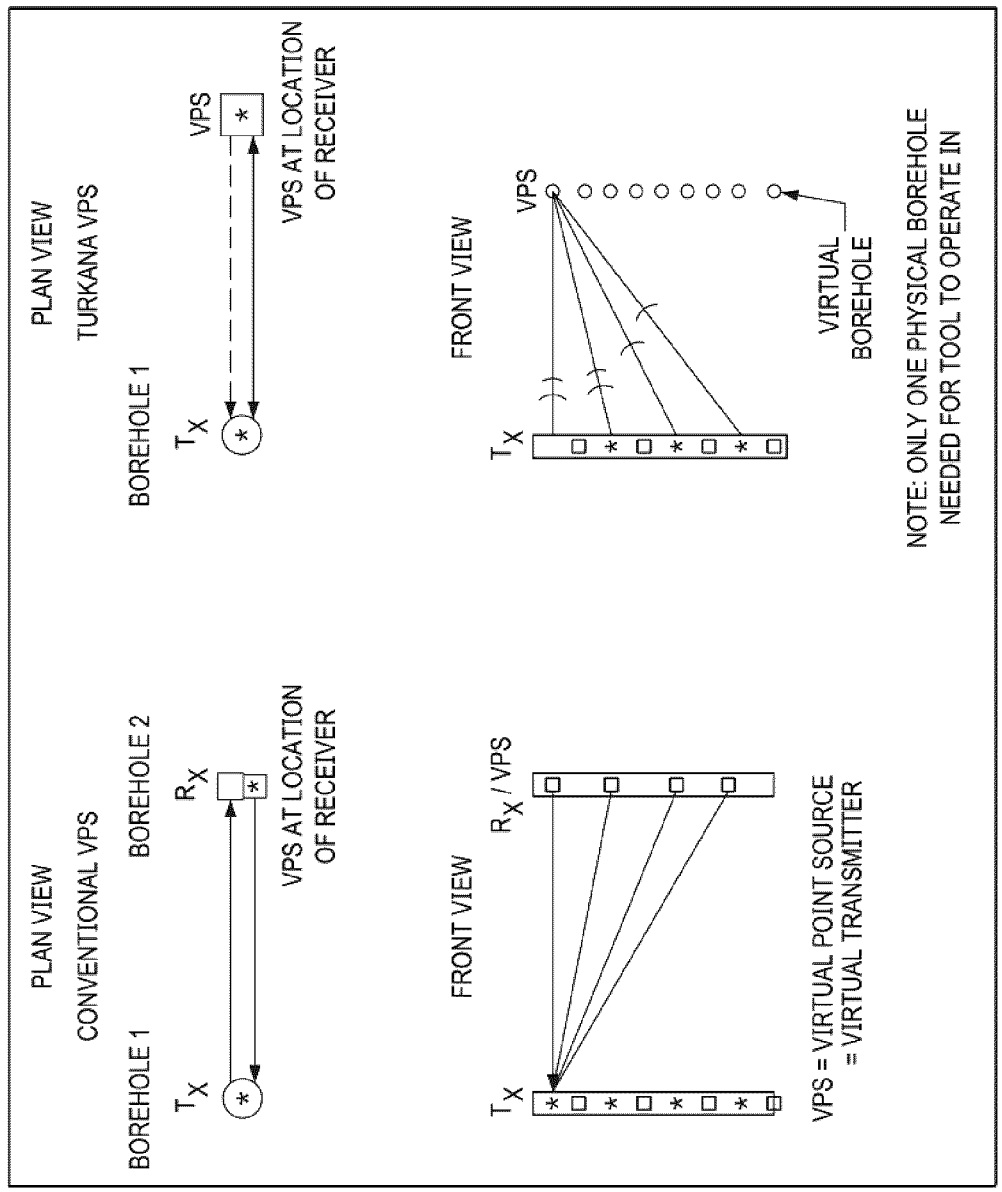
Figure 22:
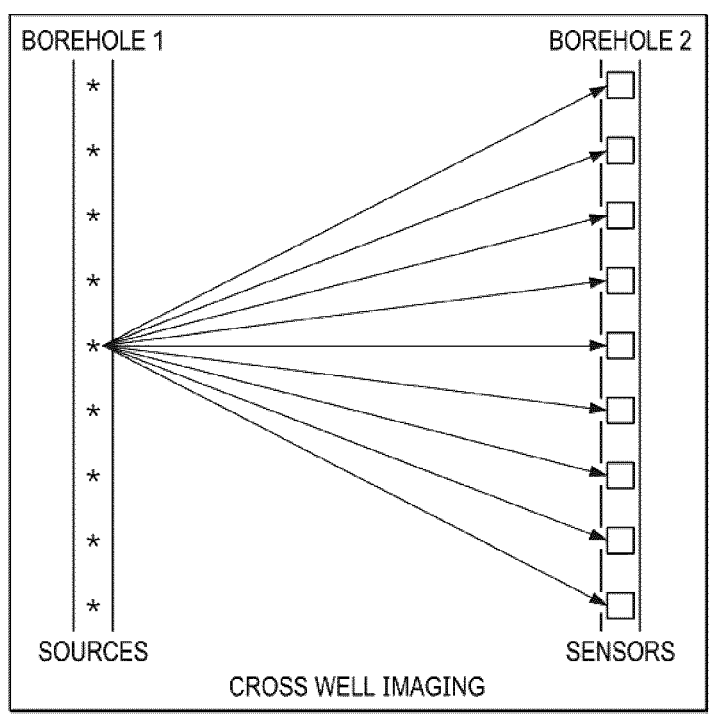

To better appreciate the advantages of the disclosed methods, a brief introduction to conventional seismic imaging is useful. Seismic imaging uses an acoustic source (i.e., a transmitter) to launch acoustic waves into a formation, and utilizes sensors (i.e., receivers) to capture the reflected waves, which are then analyzed to help determine the subsurface structure. Seismic imaging is based on the geometry of where the source(s) and receiver(s) are positioned with respect to the formation of interest. As shown in FIG. 18, the positioning of the sensors and the resulting waves that are recorded can be considered sets of triangles. Note that if the land surface area, over which the receivers are to be placed, is small or limited, the depth to which the seismic waves can penetrate will be limited (i.e., shallower). A smaller surface arrangement of sensors is the same as having a smaller imaging aperture, hence the focal depth would tend to be shorter or shallower.

Creating a large enough aperture (i.e., arrangement of sensors) when carrying out land-based seismic surveys can be difficult when the surface areas include obstacles such as, for example, jungle, desert, arctic tundra, forest, urban settings, mountain regions, and savannah, and can also be a problem because of land ownership issues where the neighboring land owners refuse to allow the seismic crews to operate on their land, thus limiting the geometry of the acquisition. As will be appreciated, this is a good reason for using downhole tools with acoustic arrays instead of conventional surface seismic imaging.

Figure 17:
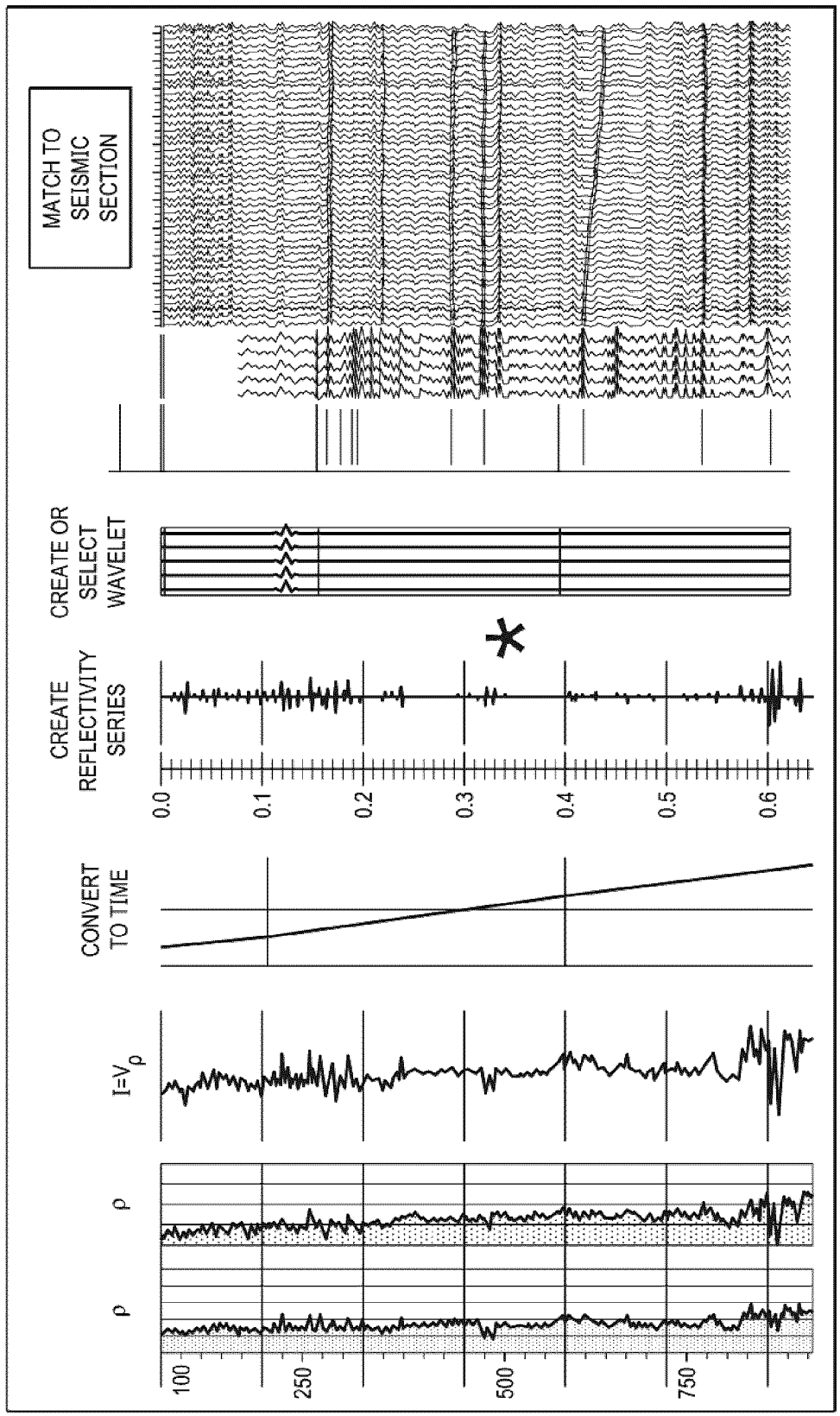
FIG. 17 depicts diagrams of conventional seismic acquisition.

Additionally, when surface seismic imaging cannot generate a sufficient resolution, synthetic traces can be generated to create a finer resolution from the limited data acquired from conventional seismic surveys. Referring now to FIG. 17, a synthetic seismogram is a seismic trace that has been constructed from various parameters obtainable from log information. It represents the seismic trace that could be observed with the seismic method at the well location. Simulated images can be referred to as synthetic images formed from density and velocity values, such as those obtained with a density log and a sonic log, respectively. A synthetic trace can be matched to an actual seismic trace acquired with conventional seismic imaging. Synthetic traces can be used when providing an estimate or model of the reservoir properties, such as formation velocity and density of the formation rock. The synthetic traces can be compared to cores, logs and real seismic data for better estimates of what is in the ground. Reservoir models are typically used to carry out hypothetical scenarios for potential drilling locations, production optimization, and reserves evaluations for accounting purposes. The combination of synthetic data with actual seismic data can be beneficial to reduce costs of performing seismic surveys.

In contrast, imaging the formation from a single borehole helps to avoid issues related to conventional surface-based seismic imaging described above, and reduce or eliminate reliance on synthetic traces that are typically needed because of the poor resolution and coverage of conventional seismic surveys. In some embodiments, the disclosed methods create virtual point sources (VPS) for imaging the formation from a borehole tool, rather than creating seismic waves from the surface and collecting data in the borehole. The borehole tool creates and transmits acoustic waves into the formation and records reflection data from waves reflected off interfaces (i.e., objects with different density properties) in the formation that are then returned to the tool in the same borehole. However, a virtual borehole can be created at a distance from the borehole containing the tool to delineate and more clearly define the formation rock and its properties without drilling more wells (as is required with cross-borehole tomography or test holes).

As can be appreciated below, embodiments of the disclosed methods apply synthetic aperture imaging, and can utilize standard seismic reconstruction methods, including Kirchhoff migration. The disclosed methods and tool can be used for "virtual" cross-borehole tomography using only a single well instead of the requisite two wells. Thus, formations can be properly delineated without having to drill extra wells, which results in substantial cost savings, because even test holes are expensive to drill, but are often drilled to gain a better understanding of the formation between production wells. Moreover, logging of the test holes is frequently carried out to obtain information required for conventional seismic imaging, such as the formation velocity and density.

Accordingly, the embodiments disclosed herein provide for acquisition of real acoustic data (e.g., seismic traces) to form images of such a zone (e.g., under an area with surface obstacles that make access to an area for conventional seismic difficult) from a single borehole. The specification now turns to exemplary downhole tools useful for implementing such methods.

Downhole tools in deep wells are subjected to high rupture and collapse forces that are orders of magnitude higher than shallower depths for which most tools are designed. To accomplish the methods described herein, a downhole modular tool may be utilized that is suitable for deep wells and which includes at least one imaging module comprising a set of acoustic transducers and corresponding receivers that are positioned along the axis of the tool and situated in a wellbore. The tool is connected to a distributed acoustic sensing (DAS) system or fiber optic lines for conveying data to a surface processor and user interface where the data is processed to create, in real-time, a two or three-dimensional image of the subsurface formation from the wellbore to a distance remote from the wellbore. In one example, the sensors are small enough to fit into a tool for a seven-inch diameter well bore, and can use ultra-broadband transmitted acoustic signals (i.e., with a wide range of frequencies) so that the signals reach deeply into the formation. The materials used for the sensors are robust and reliable for very high pressures and temperatures. The sensors transmit electromagnetic waves or acoustic waves.

One version of the acoustic downhole tool includes transducers, motors for rotating the transducers, wireline setup and data transfer, positioning board, power systems, locking mechanism, processing modules (surface and downhole), user interface and 2D and 3D visualization capabilities. Versions of the downhole tool with associated data processing methods are used to acoustically interrogate and image the near and far region from a borehole in a subsurface reservoir. Some embodiments of the downhole tool comprise various configurations of adaptive acoustic arrays including, but not limited to, active or passive arrays, synthetically focused arrays, divergent arrays, phased active arrays, arrays that use an ultra-sparse number of transmitters and receivers, arrays of variable length with a virtually unlimited number of transmission and reception locations, parametric arrays, and arrays that use multiple transducers and receivers concurrently.

Figure 2:
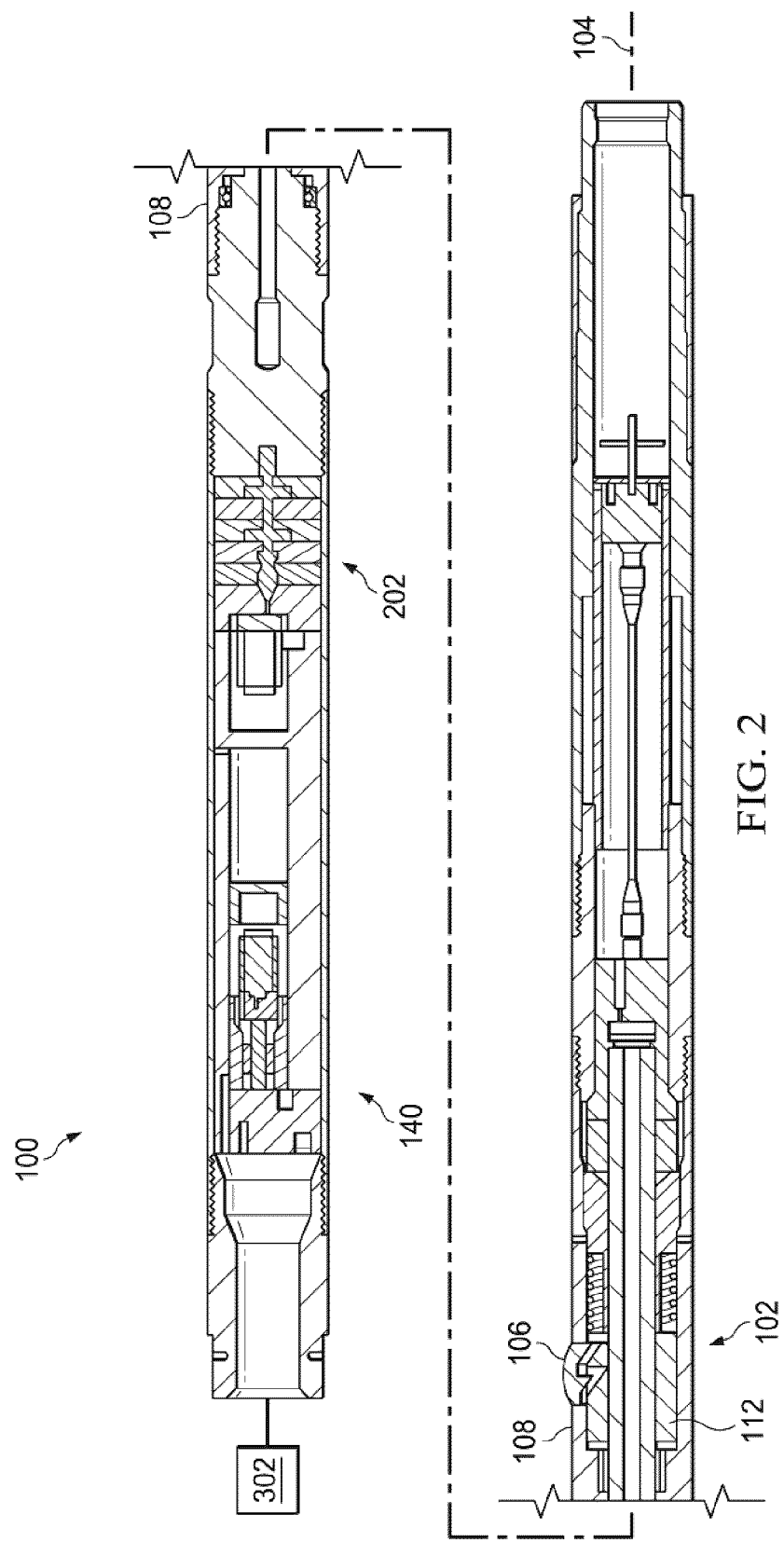
FIG. 2 is a sectional side view of an embodiment of a downhole tool assembly.
Figure 4A:
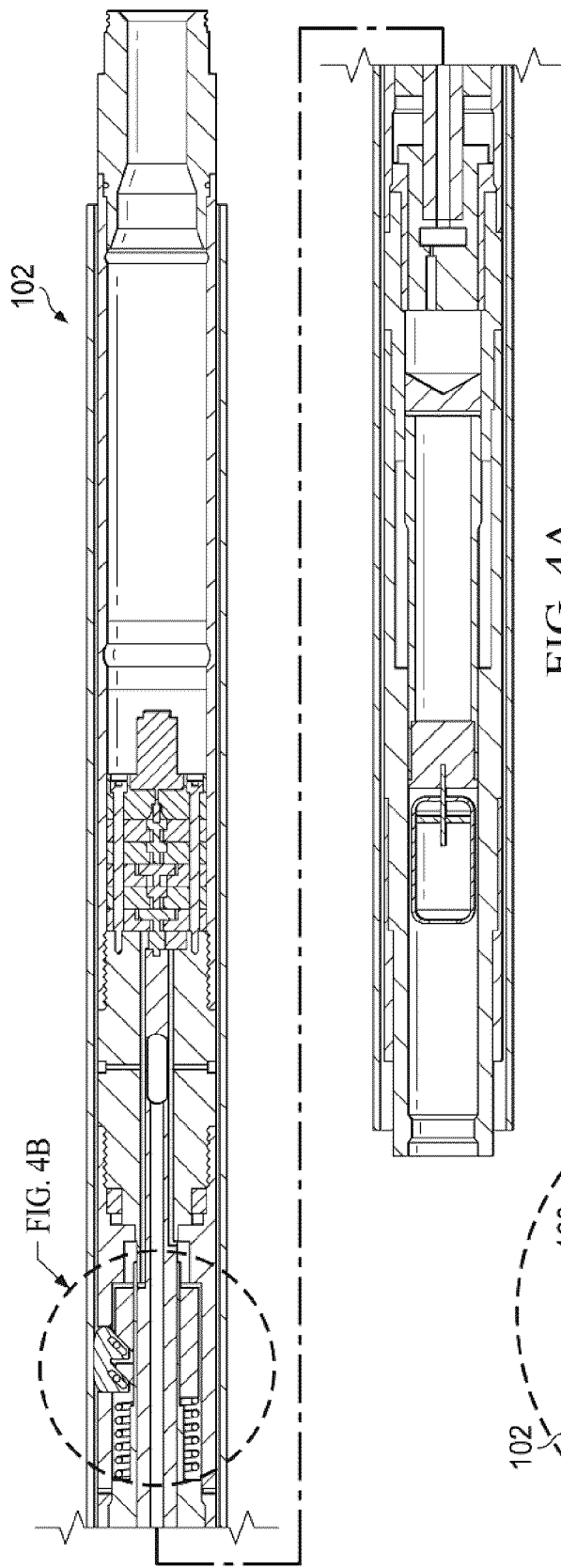
FIG. 4 is a side view of the anchor tool of FIG. 3 showing the dogs in a locked position.
Figure 4B:
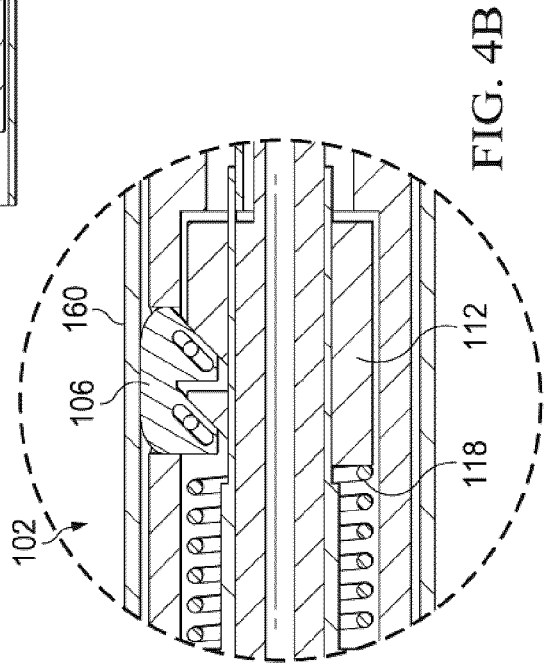

FIGS. 1 and 2 depict examples of a system 100 for downhole operation in a well having a wellbore and an axis. The system 100 can include an anchor sleeve 102 having an axis 104 and configured to secure and maintain an axial position of the system 100 in the wellbore. The anchor sleeve 102 comprises dogs 106 that can be hydraulically-actuated. The anchor sleeve 102 can have an unlocked position (FIG. 3) wherein the dogs 106 are at least substantially within the anchor sleeve 102 and are not intentionally engaging the wellbore or casing 160 of the wellbore. The anchor sleeve 102 also can have a locked position (FIG. 4) wherein the dogs 106 extend radially from the anchor sleeve 102 into direct physical contact with the wellbore or the casing 160 of the wellbore. For example, the hydraulic force applied to the dogs 106 can be in a range of 0 psi to 3000 psi. In another example, the hydraulic force can be up to 30,000 psi.

Figure 5:
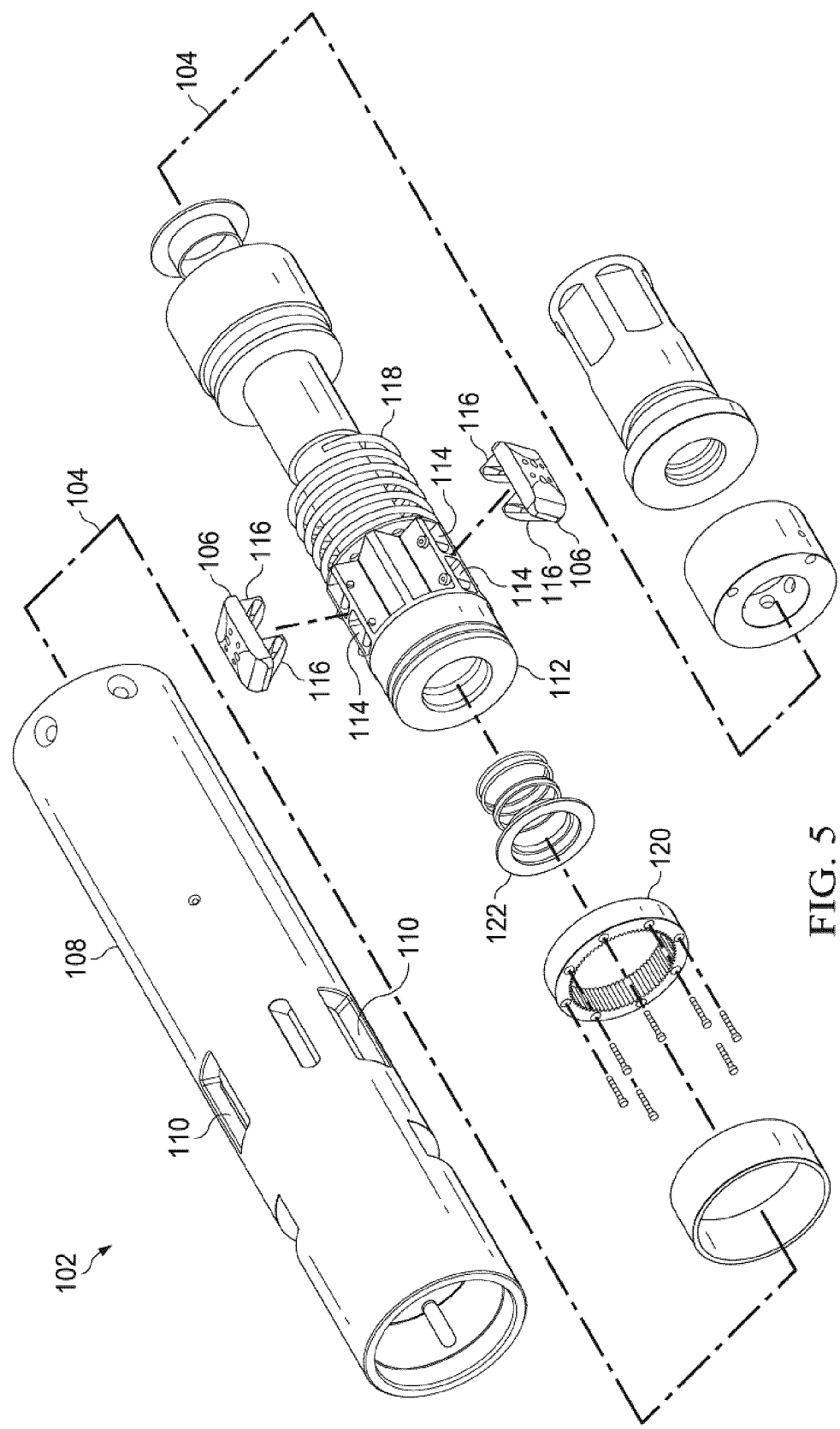
FIG. 5 is an exploded, isometric view of an embodiment of an anchor tool.

In the locked position, embodiments of the dogs 106 of the anchor sleeve 102 centralize the anchor sleeve 102 in the wellbore with respect to the axis 104, such that the anchor sleeve 102 (and system 100) is substantially co-axial with the axis of the wellbore. The anchor sleeve 102 is repeatably resettable between the unlocked and locked positions. The anchor sleeve 102 can include a lock housing 108 (FIG. 5) having open windows 110 in which the dogs 106 reside. The dogs 106 can be movably or slidably mounted to a piston 112 (such as a brass piston) that is axially movable within the lock housing 108. Both the piston 112 and dogs 106 can include diagonal surfaces 114, 116, respectively, relative to the axis 104 on which the dogs 106 contact the piston 112 and lock housing 108, in some versions, and move between the unlocked and locked positions.

In addition, the anchor sleeve 102 can include a piston return spring 118 that can axially move the piston 112 from the locked position to the unlocked position after hydraulic pressure is released. Other components of the anchor sleeve 102 can include a ring gear 120, a bearing 122 and various other bearings, hardware, seals and fasteners, as shown.

Figure 6:
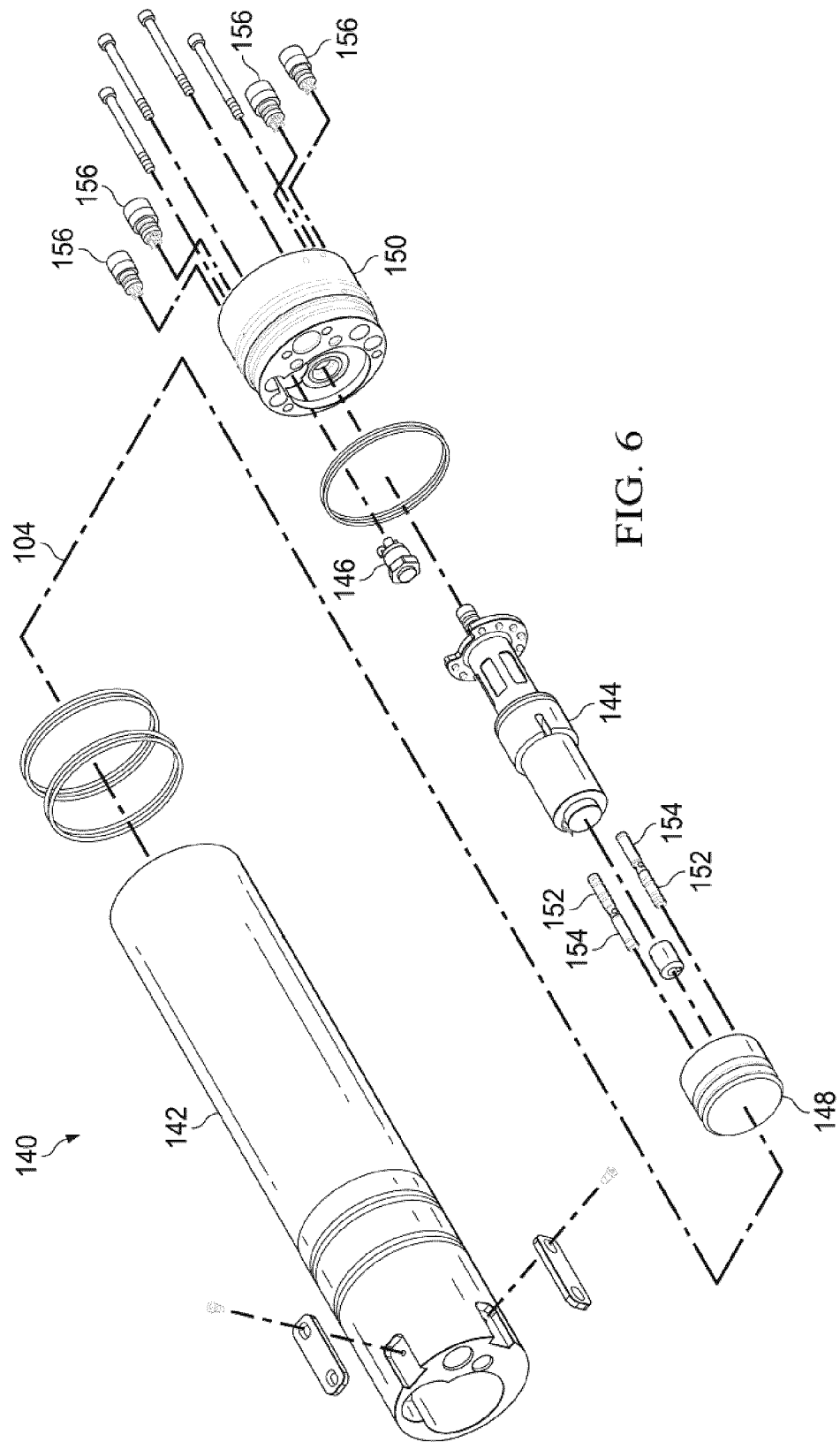
FIG. 6 is an exploded, isometric view of an embodiment of a hydraulic tool.

Embodiments of the anchor sleeve 102 further include a hydraulic system 140 (FIGS. 1, 2 and 6) for actuating the piston 112 and dogs 106. As shown in FIGS. 1 and 2, the anchor sleeve 102 is not necessarily directly axially adjacent to the hydraulic system 140, such that it can be axially spaced apart therefrom. Alternatively, the anchor sleeve 102 can be directly axially adjacent to the hydraulic system 140. Components of the hydraulic system 140 can include a hydraulic reservoir 142, a hydraulic motor 144, an electric solenoid valve 146, a pressure compensation piston 148, a hydraulic manifold 150, a pressure relief valve 152 (e.g., 3000 psi), a check valve 154, electrical bulkhead connectors 156 and various other bearings, hardware, seals and fasteners, as shown.

Figure 7:
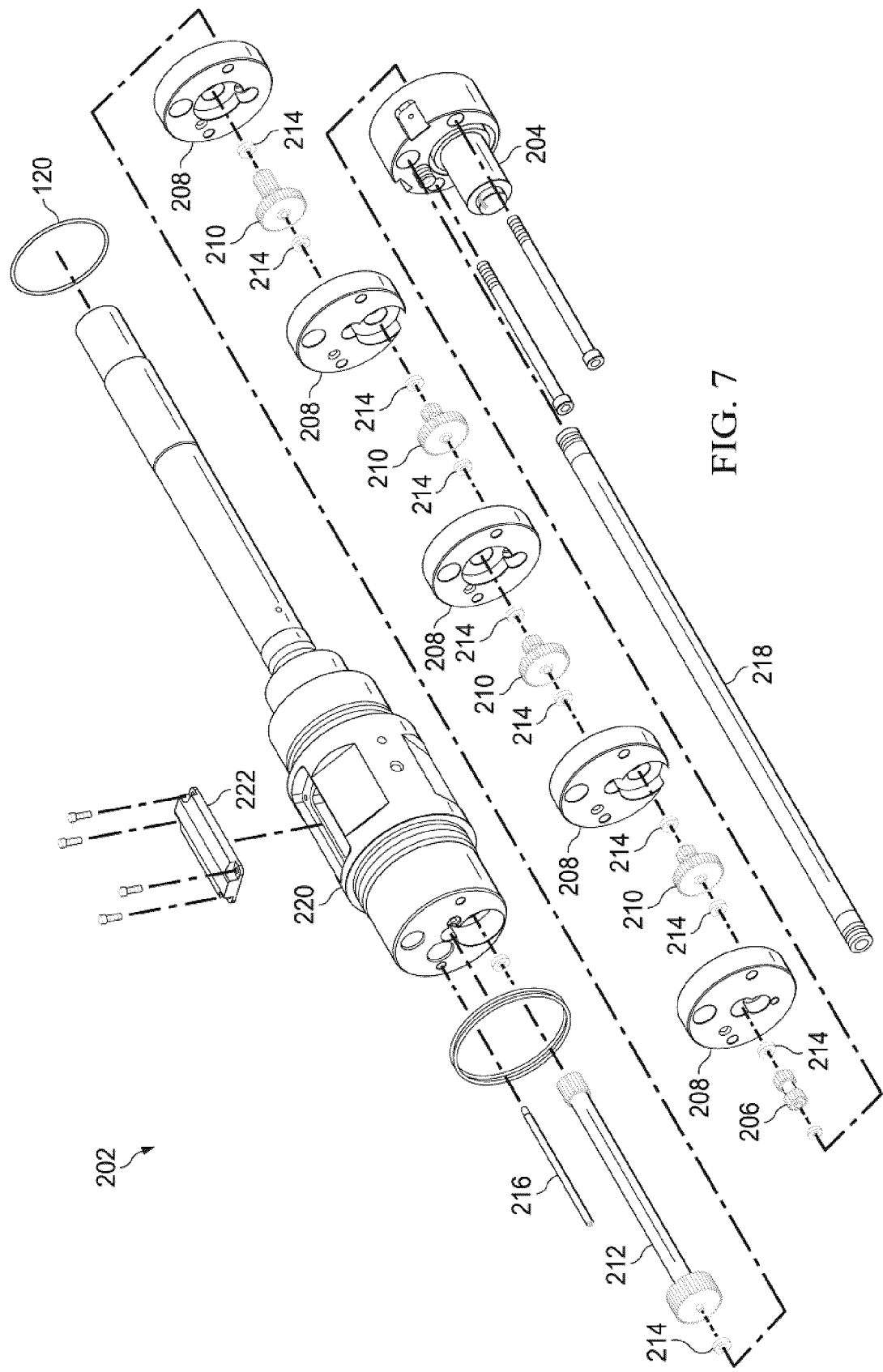
FIG. 7 is an exploded, isometric view of an embodiment of a rotation tool.
Figure 8:
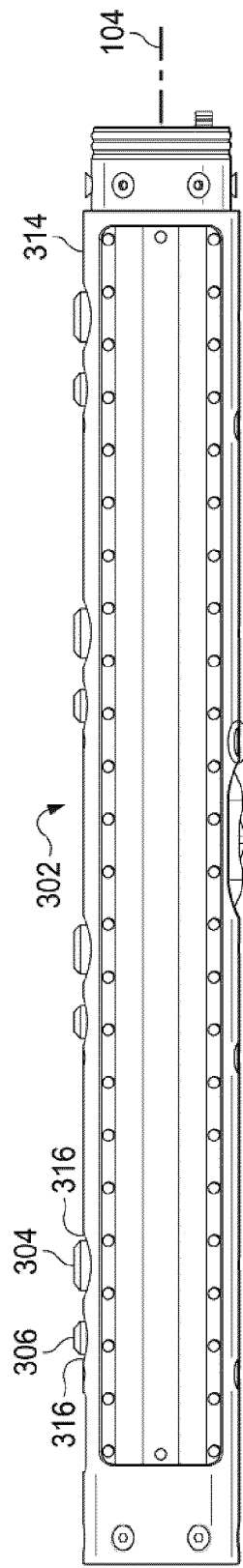
FIG. 8 is a side view of an embodiment of an imaging tool showing transducers in an extended position.

As shown in FIGS. 1, 2 and 7, the transmission assembly 202 (in this example) is coupled to the anchor sleeve 102 and to an imaging tool 302. The transmission assembly 202 can be configured to rotate the imaging tool 302 in the wellbore to selected circumferential (i.e., azimuthal) angles with respect to the axis 104. The imaging tool 302 (FIGS. 8-10) can include transducers, such as transmitters 304 and receivers 306, that can be configured to image a formation in which the well and system 100 resides.

The transmission assembly 202 (FIGS. 1, 2 and 7) can include a rotation motor 204 having a motor gear 206. The transmission assembly 202 can further include a single stage or multi-stage transmission with transmission spacers 208, gears 210, a spur gear 212, bearings 214, an oil tube 216 (e.g., high pressure) and a wiring tube 218. The transmission also can include a rotation mandrel 220 having a wiring hatch cover 222 and coupled to the ring gear 120 (FIGS. 5 and 7) of the anchor sleeve 102 (in some embodiments). The transmission assembly 202 can include various other bearings, hardware, seals and fasteners, as shown.

Versions of the transmission assembly 202 can rotate the transmission assembly 202 relative to the anchor sleeve 102 when the anchor sleeve 102 is in the locked position. In some examples, when the anchor sleeve 102 of the system 100 is in the locked position, everything attached to and below the transmission assembly 202 (such as the imaging tool 302) can rotate with the transmission assembly 202. In other examples, the transmission assembly 202 can rotate the imaging tool 302 as the system 100 is moving axially within the well.

In some embodiments, the transmission assembly 202 can be configured to rotate at a constant rate, a variable rate, an intermittent rate or only to specific circumferential angles from a stop point in, for example, a plane normal to the axis 104. In one version, the transmission assembly 202 is configured to incrementally rotate the imaging tool 302 by increments as small as less than one degree relative to the axis 104. In other versions the rotation tool can incrementally rotate the imaging tool 302 at larger increments, such as 0 degrees to 360 degrees or more. In addition, the transmission assembly 202 can be configured to rotate the imaging tool 302 at a constant rotational speed of 0.1 degree per minute to 5 degrees per second. Examples of the transmission assembly 202 can have a rotational range of 0 degrees to 400 degrees relative to the axis 104.

Referring now to FIGS. 1, 2 and 8-15, the imaging tool 302 can include at least one of an acoustic imaging system, well-logging tool, downhole seismic array, adaptive acoustic array, active array, passive array, synthetic array focused array or divergent array. The system 100 can further comprise a fiber optic multiplexer 308 (FIG. 1) coupled to the imaging tool 302 for communicating with a device 310 (e.g., a laptop computer) at a surface of the well via fiber optics. In addition, the system 100 can include a data communications line in addition to a fiber optics communications line extending from the surface of the well to the system 100 when it is downhole in the well. The data communications line can be copper-based (or another material). In one example, the data communications line can be redundant for back-up data transmission if the fiber optics is inoperable or damaged. In addition, the data communications line can provide active power delivery downhole.

As shown in FIG. 1, some versions of the imaging tool 302 can include a plurality of transducer sections 312 (e.g., two shown in FIG. 1). The transducer sections 312 can be adjacent to each other (as shown), or the transducer sections 312 can be spaced apart from each other by spacers.

Embodiments of the imaging tool 302 can include a housing 314 (FIGS. 8-15) having one or more open windows 316 for unobstructed access to the wellbore. The transducers 304, 306 can be positioned in the open windows 316. Accordingly, versions of the transducers 304, 306 are not encased with the tool such that they are unobstructed and exposed to an environment of the well.

Figure 9:
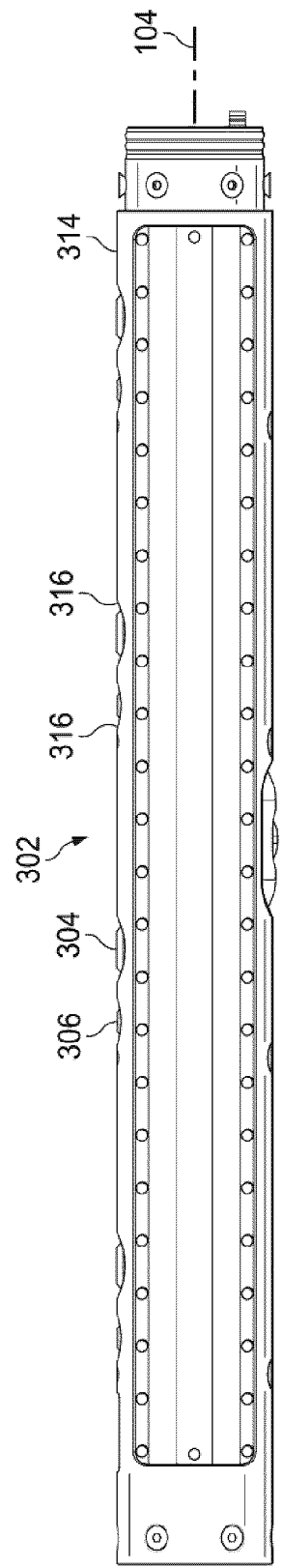
FIG. 9 is a side view of the imaging tool of FIG. 8 showing transducers in a retracted position.
Figure 10:
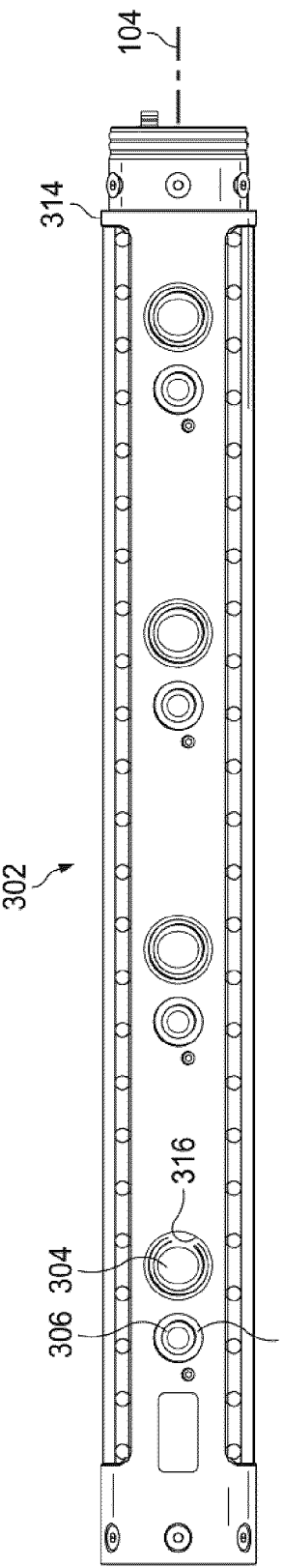
FIG. 10 is a front view of the imaging tool of FIG. 8.
Figure 11:
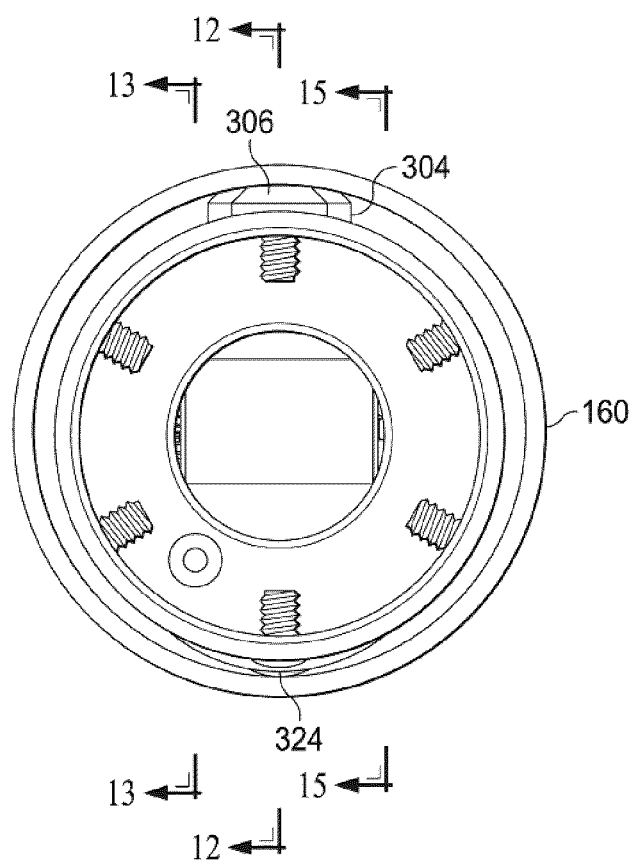
FIG. 11 is an axial end view of the imaging tool of FIG. 8.
Figure 12:
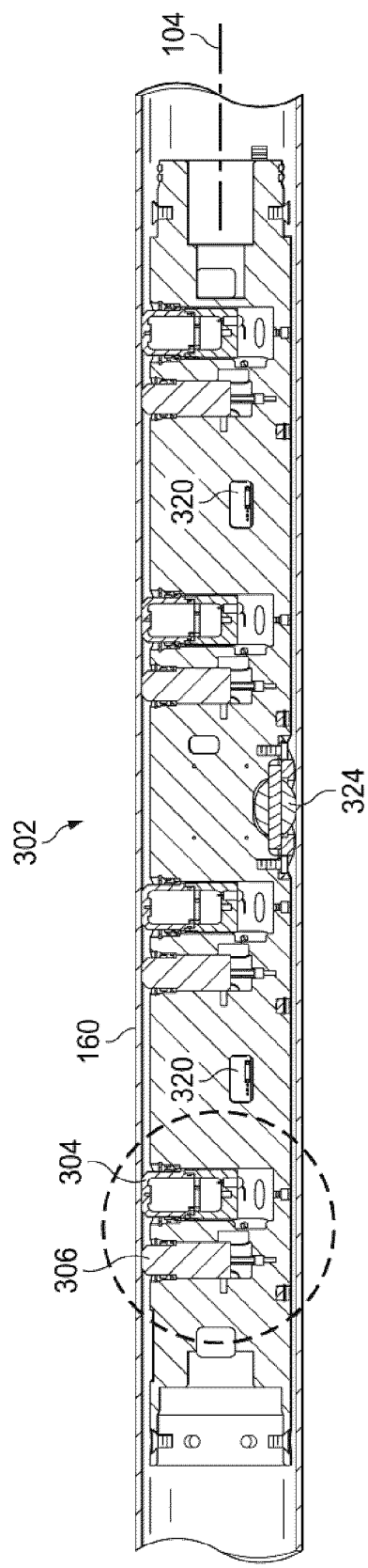
FIG. 12 is a sectional side view of the imaging tool of FIG. 11, taken along the line 12-12 of FIG. 11.
Figure 13:
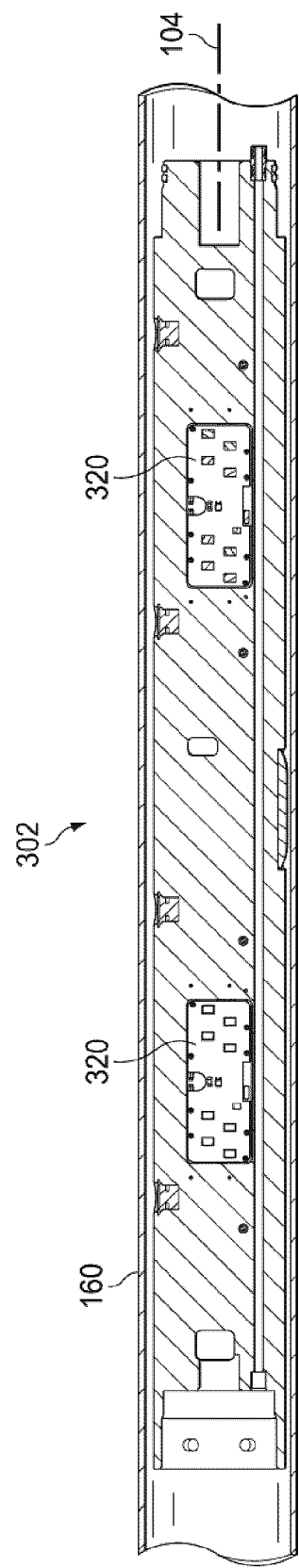
FIG. 13 is a sectional side view of the imaging tool of FIG. 11, taken along the line 13-13 of FIG. 11.
Figure 14:
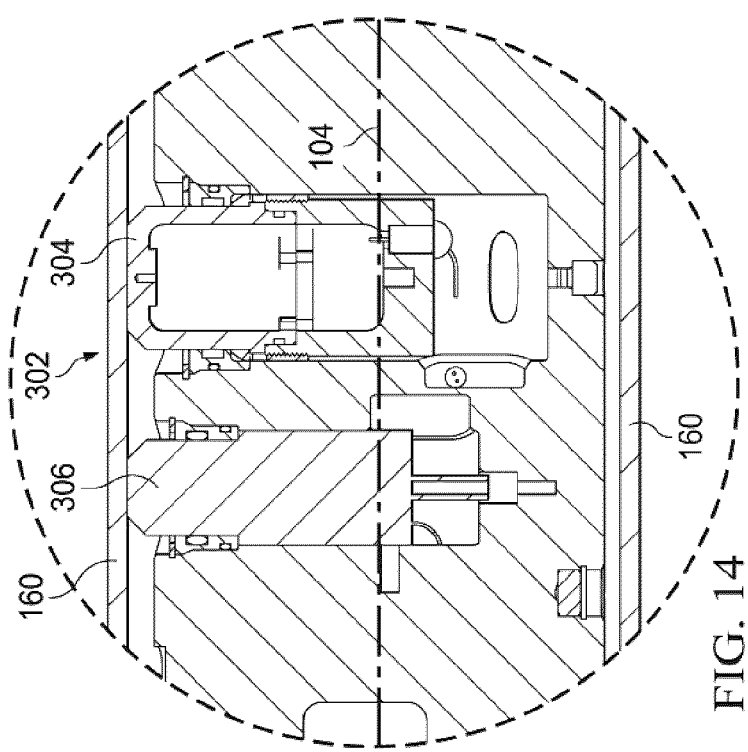
FIG. 14 is an enlarged sectional side view of a portion of the imaging tool of FIG. 12.

As shown in FIG. 9, the transducers 304, 306 can have a retracted position wherein the transducers 304, 306 are at least substantially within the housing 314 and not intentionally contacting the wellbore or casing 160 in the wellbore. In addition, the transducers 304, 306 can have an extended position (FIGS. 8, 12 and 14) wherein the transducers 304, 306 directly physically contact the wellbore or the casing 160 of the wellbore. In other words, the transmitters 304 and receivers 306 can be in the retracted position wherein they are substantially radially retracted within the housing 314 relative to the axis 104. In the extended position, they can extend radially outward from the housing 314 relative to the axis 104 and be positioned to directly physically contact the wellbore or the casing 160 of the wellbore.

In some versions, at least some of the transducers (e.g., the transmitters 304) are hydraulically-actuated between the retracted and extended positions. Other ones of the transducers (e.g., the receivers 306) can be spring-actuated (e.g., lightly sprung) to move to the extended position and gently couple with the casing 160. The transmitters 304 can have a transmitter hydraulic system that is separate from the hydraulic system 140 (FIG. 1) for the anchor sleeve 102. In another version, the transmitters 304 and the anchor sleeve 102 are on the same hydraulic system. Examples of the hydraulic force for the transmitters 304 can be in a range of 0 psi to 3000 psi, depending on a number of variables. The spring force for the receivers 306 can be in a range of 0 lbf to 20 lbf. A roller 324 (FIGS. 8 and 12) can be provided on the imaging tool 302 to reduce friction as the imaging tool 302 is rotated within the wellbore.

As described herein, the imaging tool 302 can include transmitters 304 for transmitting imaging signals, and receivers 306 for receiving returning signals. Versions of the imaging signals can be transmitted at a frequency in a range of 2 Hz to 25 kHz, for example. Other frequencies are possible depending on the specific transmitters employed.

The transmitters 304 and receivers 306 can be configured in a linear array, as shown. Alternatively, they can be configured in a non-linear manner, and can range anywhere from a linear configuration to a random configuration, and from 2D to 3D. In addition, the transmitters 304 and receivers 306 can be interleaved in an alternating pattern, as illustrated. Moreover, the transmitters 304 and receivers 306 can be uniformly patterned in a symmetrical configuration. In some versions, the transmitters 304 are identical to each other. In other versions, the receivers 306 are different and can include a combination of geophones and hydrophones.

Versions of the transmitters 304 and receivers 306 can comprise piezostrictive or magnetostrictive materials. In some examples, the transmitters 304 and receivers 306 include, but are not limited to, alloys comprising at least one of Fe, Tb and Py, such as Terfenol-D® (comprising at least one of Tb, Fe and Dy) or galfenol (Fe and Ga alloy). The tool is able to use any transmitters or receivers that are designed to fit within the tool.

Embodiments of the transmitters 304 can simultaneously emit signals as the receivers 306 receive signals. The system 100 can further include one or more power management modules 320 (e.g., two shown in FIGS. 12 and 13) that can provide functions such as to managing and distributing the power and signals to the transmitters 304. In some versions, the power management module 320 can have a power rating in a range of 500 W to 3000 W.

Figure 15:
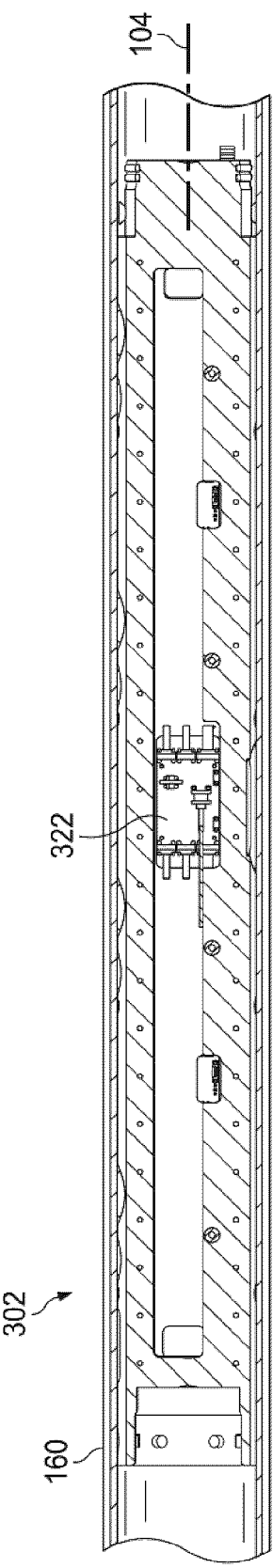
FIG. 15 is a sectional side view of the imaging tool of FIG. 11, taken along the line 15-15 of FIG. 11.

In addition, the imaging tool 302 can include a module controller board 322 (FIG. 15). The module controller board 322 can generate waveforms, such as pre-set waveforms for the transmitters 304 of the imaging tool 302. For example, the pre-set waveforms can comprise a signal of any form within a selected range of frequencies, depending on at least one variable. In other examples, the pre-set waveforms can include at least one of:

P(reset) 01=preset waveform 1=4 kHz
P00=2 kHz
P02=8 kHz
P03=12 kHz
P04=Chirp (2-12 kHz), 5 ms, constant current
P05=Chirp (2-12 kHz), 10 ms, constant current
P06=Chirp (2-12 kHz), 5 ms, constant voltage
P07=Chirp (2-12 kHz), 10 ms, constant voltage
P08=Taper Chirp (2-12 kHz), 5 ms, constant current; or
P09=Taper Chirp (2-12 kHz), 10 ms, constant current; or In addition, a pre-set waveform can include a taper chirp (e.g., 2 Hz to 25 kHz), for longer periods of time. These waveforms are provided only as examples. The waveforms and frequencies can vary depending on the transmitter selected. Moreover, the waveforms can be selected contemporaneously during operation in real-time, such as an operator selecting waveforms that are not pre-determined or pre-set downhole.

As shown in FIG. 1, an example embodiment of the system 100 includes a positioning system 326. The positioning system 326 can provide an azimuth orientation, north-finding solution for the imaging tool 302. In addition, the positioning system 326 can comprise at least one of an accelerometer, gyroscope, magnetometer or dip meter. A method of controlling the axial translation and azimuthal rotation of devices or tools can include but is not limited the following: seismic sensor systems, fiber optic sensor systems, active and/or passive optical systems, laser systems, acoustic systems, ultrasonic sensor systems, electromagnetic sensor systems, active and/or passive electromagnetic sensor systems such as radar/ground penetrating radar systems.

The system also can further comprise a power supply 328 (FIG. 1). The power supply 328 can comprise a voltage source of 300 V to 600V, and variable current output. In addition, the system 100 can include a tool controller section 330, which can include a local controller 332 and motor controller 334, for controlling the anchor sleeve 102, transmission assembly 202 and imaging tool 302. The system 100 can have a computer (e.g., laptop computer) at the surface of the well for communicating with the imaging tool 302 and data acquisition. The system 100 can be operated remotely by an operator, or the system 100 can operate autonomously. The system 100 can be configured to provide near-field imaging adjacent the well, and far-field imaging up to, for example, 300 meters from the well, depending on variables such as the aperture of the imaging tool 302 and the transmitter(s) selected.

Other features of the system 100 can further include a cable head connector 402 (FIG. 1) that can be configured to connect to at least one of a wireline, tubing, drill pipe, etc. In this way, the system 100 can be configured to be thereby lowered into and retrieved from the wellbore. The system 100 can be further provided with a roller bearing 404 and bullnose end 406.

Figure 16:
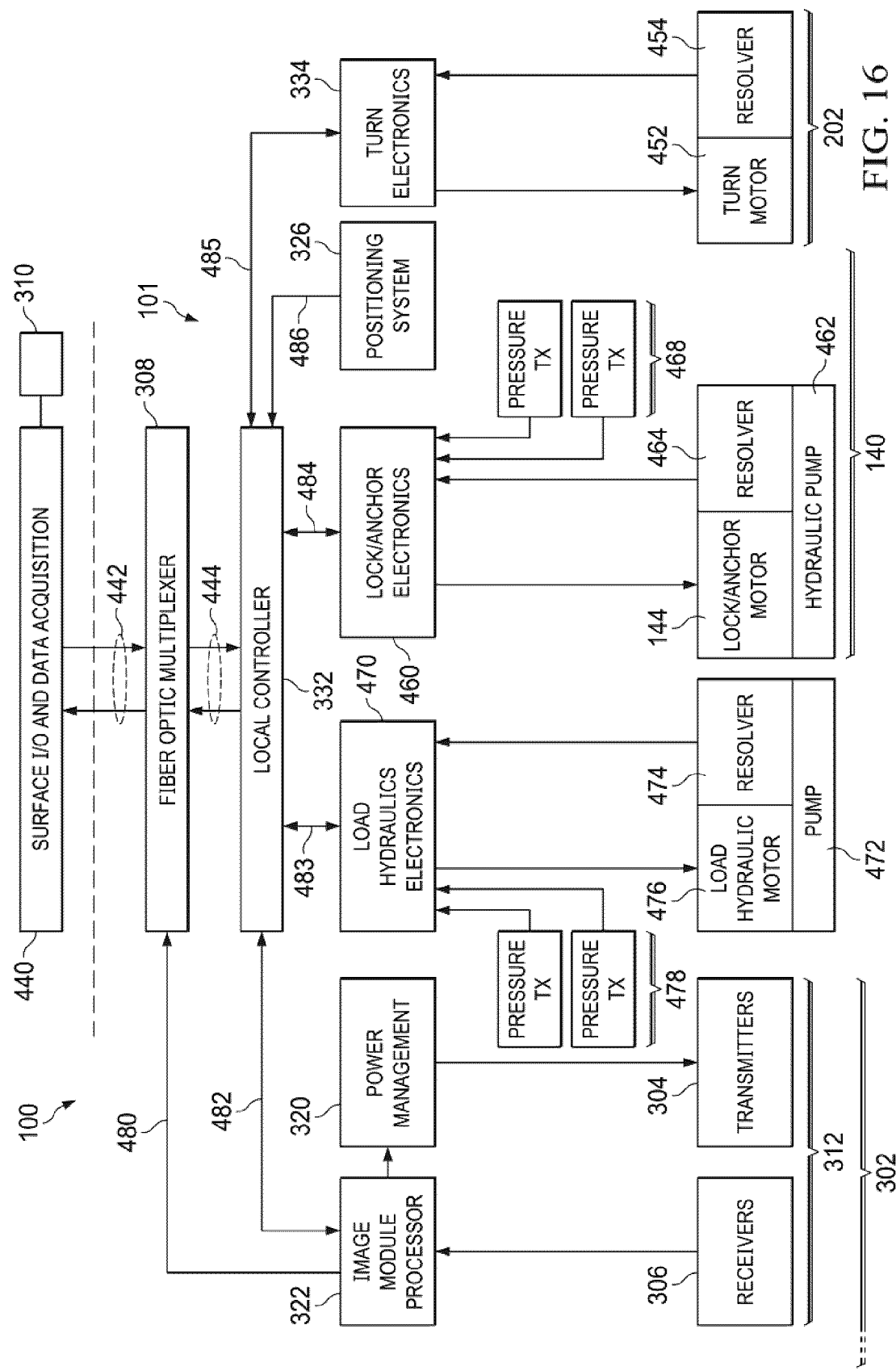
FIG. 16 is a schematic, high level block diagram of an embodiment of a downhole tool system.

Referring now to FIG. 16, a block diagram is shown representing the electrical and control aspects of an exemplary embodiment of the system 100, which includes the downhole tool assembly 101 and a surface I/O and data acquisition module 440 (the "surface module 440") at the surface of the well, which can include or be connected to the device 310 (e.g., a laptop computer). A local controller 332 provides overall control of the downhole tool assembly 101, and communicates to/from the surface module 440 (and thus device 310) by way of the fiber optic multiplexer 308 and communication path 442 which, as described above, can include one or more electrical wires in addition to (or in place of) one or more fiber optic cables. These electrical wires can be used for data communications as well as active power delivery.

The local controller 332 is coupled to the image module processor 322, load hydraulics electronics module 470, lock/anchor electronics module 460, rotation or turn electronics module 334, and positioning system 326, by way of respective communication paths 482, 483, 484, 485, and 486. Each will be described in turn.

The image module processor 322 can communicate with the local controller 332 over bidirectional communication path 482 to receive command and other information from the local controller 332, and to provide status and other information to the local controller 332. The image module processor 322 also can be coupled to the power management module 320 which, in turn, are respectively coupled to one or more corresponding transmitters 304. The command information can include, for example, an indication of the desired waveform (e.g., type, frequency, power level) to be emitted from the transmitters 304, as well as start/stop signals. The image module processor 322 is also coupled to receivers 306 to receive, for example, acoustic signals from each receiver 306, and the image module processor 322 is further directly coupled to the fiber optic multiplexer 308, by way of unidirectional communication path 480, to communicate such imaging signals to the surface module 440 without any buffering and retransmission by the local controller 332. This arrangement is helpful to provide a very high-bandwidth digital communication path from the image module processor 322 to the surface module 440, such that real-time imaging data can be transmitted to the surface and appropriately acquired and processed by the device 310. The image module processor 322, power management module 320, transmitters 304, and receivers 306 can advantageously be disposed within a single transducer section 312 (FIG. 1). An additional instance of the image module processor 322, power management module 320, transmitters 304, and receivers 306 can be disposed within a second transducer section 312, which together can be viewed as being part of the imaging tool 302. As described above, the imaging tool 302 of the downhole tool assembly 101 can include one, or more than one, such transducer sections 312.

The load hydraulics electronics module 470 ("load module 470") communicates with the local controller 332 over bidirectional communication path 483 to receive command and other information from the local controller 332, and to provide status and other information back to the local controller 332. The load module 470 is coupled to a load hydraulic motor 476 for controlling such motor to operate a hydraulic pump 472. A resolver 474 is mechanically coupled to the motor 476 or the hydraulic pump 472 to provide position information to the load module 470. A pair of pressure sensors 478 also provides pressure information to the load module 470. Such pressure information can include a real-time measurement of the applied pressure of the transducers 304 against a wellbore, so that the load module 470 can appropriately adjust the control to the load hydraulic motor 476. In some embodiments, the load module 470 can be included within the tool controller section 330. In some embodiments, the pair of pressure transmitters 478 can be included within a single transducer section 312. In some embodiments, each of the pair of pressure transmitters 478 may be included within a corresponding transducer section 312.

The lock/anchor electronics module 460 ("lock/anchor electronics 460" shown in FIG. 16) communicates with the local controller 332 over bidirectional communication path 484 to receive command and other information from the local controller 332, and to provide status and other information back to the local controller 332. The anchor module 460 is coupled to a lock/anchor motor 144 ("anchor motor 144" or "hydraulic motor 144") for controlling such anchor motor 144 to operate a hydraulic pump 462. A resolver 464 is mechanically coupled to the anchor motor 144 or the hydraulic pump 462 to provide position information to the anchor module 460. A pair of pressure sensors 468 also provides pressure information to the anchor module 460. Such pressure information can include a real-time measurement of the applied pressure against a wellbore by the dogs 106 of the anchor sleeve 102 (FIGS. 2, 4), so that the anchor module 460 can appropriately adjust the control to the anchor motor 144. In some embodiments, the anchor module 460 can be included within the tool controller section 330, and the anchor motor 144 can be positioned within the hydraulic system 140. In some embodiments, the pair of pressure transmitters 478 can be included within the hydraulic system 140, or within the anchor sleeve 102. In some embodiments, individual pressure transmitters 478 can be positioned within the anchor sleeve 102 and the imaging tool 302, respectively, such as in embodiments where the anchor hydraulics is used for both the anchoring tool and the imaging tool and the load module 470 and associated motor 476, pump 472, resolver 474, and pressure transmitters 478 are not implemented.

The rotation or turn electronics module 334 (i.e., "motor controller 334") communicates with the local controller 332 over bidirectional communication path 485 to receive command and other information from the local controller 332, and to provide status, position, and other information back to the local controller 332. The motor controller 334 is coupled to turn motor 452 for rotating the transmission assembly 202. The turn motor 452 can be viewed as including the rotation motor 204, motor gear 206, transmission spacers 208, and gears 210, all as described above (FIG. 7). The turn motor 452 can also be viewed as corresponding to the rotation motor 204. A resolver 454 is mechanically coupled to the turn motor 452 to provide position information to the motor controller 334. In some embodiments, the motor controller 334 can be included within the tool controller section 330, and the turn motor 144 can be positioned within the hydraulic system 140 (FIG. 2). Other configurations are contemplated. For example, the turn motor 452 and the motor controller 334 can reside within the same modular section of the downhole tool assembly 101.

The positioning system 326 communicates with the local controller 332 over unidirectional communication path 486 to provide location-related information to the local controller 332. The positioning system 326 can provide an azimuth orientation, north-finding solution for the imaging tool 302. In addition, the positioning system 326 can comprise at least one of an accelerometer, gyroscope, magnetometer, and dip meter. In some embodiments, the positioning system 326 can be disposed with the power supply 328 in the same modular section of the downhole tool assembly 101 (FIG. 1), which advantageously can be positioned adjacent the tool controller section 330 to reduce cabling interconnection lengths, although other placement configurations are also contemplated which can provide for communications with the local controller 332.

The functional partitioning described in regards to FIG. 16 was chosen to more easily describe the operation of and coordination of various sub-systems within the exemplary downhole tool assembly 101, but such partitioning is merely an example and is not required. For example, each of the various control modules, such as image module processor 322, load module 470, anchor module 460, and turn module 334, can individually, or in any combination or subcombination, be viewed as being part of the local controller 332.

In some embodiments, the fiber optic multiplexer 308 can be configured to transmit and receive respective bit-serial data streams to and from the surface module 440. Such an arrangement can utilize a respective fiber for each direction, but can also utilize a single fiber for both directions using different light frequencies, or using time multiplexing. In some embodiments, the fiber optic multiplexer 308 can be configured to multiplex between several inputs, corresponding to the communication path 444 from the local controller 332 and the communication path 480 from the image module processor 322, and perform a parallel-to-serial conversion for transmission up the wellbore to the surface module 440, and analogously configured to perform a serial-to-parallel conversion of data received from the surface module 440, then communicate the parallelized data to the local controller 332 by way of the communication path 444. In other embodiments, the communication path 442 can include multiple fibers, and be configured to provide a parallel data channel conveyed over the fiber optic communication path 442, in one or both directions.

In various embodiments, one or more of the communication paths 480, 482, 483, 484, 485, 486 can be implemented to convey either serial or parallel data, using one or more electrical cables and/or optical fibers/wireless telemetry systems.

Having thus described exemplary embodiments of a suitable downhole tool for use in the methods disclosed herein, a brief return to conventional techniques is warranted to provide additional context for the disclosed methods. Sonic logging (i.e., acoustic logging) provides a formation's interval transit time, which is a measure of a formation's capacity to transmit seismic waves which varies with lithology and rock textures. High resolution microscale seismic images of structural features in the near-borehole region (10 to 15 m) can be obtained with acoustic logging. Conventional seismic-processing techniques are used to extract compressional and shear reflections/waves from the data. Sonic logs use signals to identify bed boundaries, thin beds, fractures, and faults in open hole and cased wells. Seismic processing is a form of imaging that uses the reconstruction of multiple reflected waves, whereas a sonic logging tool acquires a single signal and thus no image reconstruction is possible.

Conventional logging tools and techniques do not focus transmitted energy to generate a virtual point source remote from the borehole. "Imaging" or acoustic logging can measure the property of speed of sound of the formation with P-waves and sometimes S-waves. As noted, the average depth of penetration of an acoustic logging tool is between 2.5 cm and 25 cm. With lower frequencies, the signals can be transmitted deeper into the formation but not much more than a meter or two.

Typical cross-borehole seismic systems (using two boreholes) can image up to 50 meters into the formation from the downhole tool. The depth to which conventional surface-based seismic is able to image is directly related to the geometry of the acquisition design. As depicted in FIG. 18, the longer the string of geophones and the selected distance from the seismic source, the deeper it will be possible to image. This is dependent on the properties of the rock formations to be imaged (density, water saturation, etc.) as they affect the velocity of sound moving through the formation.

Returning now to techniques of the methods herein, embodiments of the system 100 can communicate imaging data in real-time with the device 310. The system 100 can be configured to image the formation from a perspective of a virtual point source (VPS) that is positioned at a selected (i.e., computed and focused) distance from the well in which the system 100 resides. The distance at which the VPS may be positioned is determined by the size of the array aperture (i.e., length of the imaging section of the tool, the number of transducers, and potentially the number and length of spacers between each segment containing the transducers). One or more techniques and capabilities of the system 100 can be utilized to acquire acoustic reflection data for image reconstruction such as, for example, angular and vertical beamforming, synthetic aperture sensing, and the use of virtual point sources. As a result, the system 100 can be viewed as a seismic-based imaging tool for imaging a formation at a distance from the wellbore in which the system 100 is located, rather than an acoustic logging tool that can record a signal related to the density or acoustic velocity of the formation in a region immediately surrounding the wellbore, within 2.5 cm to 25 cm of the acoustic logging tool. Using embodiments of the system 100, imaging up to 100 meters into the formation has been achieved.

A virtual point source (VPS) can be created within the formation by transmitting acoustic waves from one or more real sources, located on the axis of the downhole tool, into the formation at right angles to the tool axis. With multiple transmitters (real sources) emitting acoustic (pressure) waves into the formation, the location of a virtual source (i.e., computed as described below) will experience a pressure change (i.e., energy is created) due to the summation (constructive wave interference) of waves at the desired location. Points other than the VPS location will experience destructive wave interference and therefore will not contribute significantly to the waves that emanate from the VPS. The receivers along the axis of the tool are used to collect the wave data reflected from each VPS.

Time delays are the basis of phasing an array or beamforming. The time delays used to focus the waves for each virtual point source (VPS) are calculated based on the location of transducers and receivers, number of VPS's and location referenced to the tool, type of waveform being used to either focus or diverge the beam of acoustic energy, and physical properties of the formation such as velocity. First, the distance between each transducer (Tx) and VPS can be estimated using Pythagoras's theorem:

$$D_{ij} = \sqrt{(X\_Tx_j - X\_VPS_i)^2 + (Z\_Tx_j - Z\_VPS_i)^2}$$

where X_Tx and Z_Tx correspond to the X and Z coordinate of the transducers, X_VPS and Z_VPS correspond to the X and Z coordinate of the VPS's, i is the number of the virtual point source and j is the number of the transducer.

Then, delays are computed by subtracting the minimum distance $D_{min}$ to each distance $D_{ij}$ and using a constant velocity:

$$\text{Delay}_{ij} = \frac{D_{ij} - D_{min}}{V_{fm}}$$

where $V_{fm}$ corresponds to the velocity of the formation. In certain embodiments the actual value of the formation velocity can be an assumption and thus this value represents a rough estimate. As can be appreciated, the calculated delay will be zero for the location corresponding to the minimum distance, and the respective calculated delays for other respective locations are offset delays. For generation of a VPS as described above, a solution is obtained directly, unlike other methods that require modeling or iterating to optimise a solution for the positioning of the VPS's.

FIGS. 19-22 include diagrams of several embodiments depicting arrays of transducers or transducer elements that can be focused and/or steered using time delays. In some examples, each array element is a transmitter on the body of the tool.

In exemplary use, the downhole portion of the system 100 can be lowered to a particular depth, anchored in the wellbore or well casing, the imaging tool (i.e., imaging section 302 of the downhole tool 101) rotated to orient the transducers to a particular circumferential (azimuthal) angle, and the timing of transmitted signals from the various transducers coordinated to generate a steered beam and sense the return signals to create a first set of image data, which is transferred via a telemetry method or otherwise communicated to the device 310. The downhole portion can then be un-anchored, moved vertically in the well to a higher or lower depth, and re-anchored so that an additional set of image data can be sensed. This can be repeated an arbitrary number of times, and the beam angle at each respective vertical depth can be configured to triangulate to (i.e., converge at) the location of the desired virtual point source. The type of transducers, the number of transducers, and the distance between transducers (e.g., number of transducer sections 312, spacing between transducer sections 312, and length of each transducer section 312), can be selected to control the resulting beam steering and formation interrogating properties (i.e., setting the array aperture of the tool). The image data can then be processed by the device 310.

In another example, the downhole portion of the system 100 can be lowered down (or raised up) an uncased wellbore or within a cased well without stopping to anchor the tool, and imaging data sensed continuously. The imaging tool can be rotated to orient the transducers to a particular circumferential angle during this descent or ascent, but in other examples the imaging tool can be rotated during the descent/ascent. In some examples the beam angle can be varied during the descent/ascent, so that the beam angle at each respective vertical depth triangulates to the location of the desired virtual point source. Imaging a formation in this manner could generate very large datasets that could make the image reconstruction difficult with current computational resources, although future computing advances will inevitably mitigate this.

In yet another example, rather than moving the tool up and down the borehole without stopping to create a VPS, beamforming is applied from a locked position to image the formation or to create VPS's at desired angle above and below the tool, with the angle being dependent on the aperture (length and spacing of the transducers on the imaging module) of the tool. In other words, a target zone can be selected, the tool positioned and locked within the wellbore, the transducer section rotated to face the direction of interest, and the data acquisition then carried out. This would be computationally more efficient than imaging a full 360-degree zone around the well-bore.

The system 100 also can communicate to a computer, the imaging data received from any VPS generated by the imaging tool 302. In other words, the VPS acts as a virtual transmitter. In one example, the VPS can be located within a non-existent "virtual" well in the formation to image the formation in the vicinity of that virtual well. The distance from the well to the VPS can be in a range of 1 meter to 300 meters, depending on variables such as the aperture of the imaging tool 302.

The imaging tool 302 can be configured to physically vibrate the formation at the VPS. In addition, the imaging tool 302 can be configured to capture return signals from the VPS which signals can be used to characterize parameters of the formation at the VPS. For example, when generating a VPS at a region distant from the borehole in which the tool is located, the parameters can include at least one of a P-wave to S-wave velocity ratio (Vp/Vs) to derive at least one of an elastic modulus of the formation, permeability or porosity of the formation.

The imaging tool 302 can create shear waves by moving the focal point (VPS) supersonically to create a vibration of the rock particles at that point. In particular, in some example cases focusing outbound acoustic energy on a location or volume may include focusing a first portion of the first outbound acoustic energy at a first location with the volume, and then focusing a second portion of the first outbound acoustic energy at a second location within the first volume, thereby creation a pressure wave within the volume. That is, in some cases focusing the outbound acoustic energy on a location or volume of the VPS is sufficient to create a return acoustic energy, but in another case the focal point may be shift (e.g., supersonically) a short distance (e.g., ¼ to ⅛ wavelength of the acoustic energy) to facilitate more efficient creation of shear waves emanating from the virtual point source.

The imaging tool can focus an acoustic beam on a point in the formation to create a VPS at the desired point. Supersonic movements of the VPS create an overpressure at that particular location in the formation rock. The overpressure in turn induces mechanical waves, of which one mode is shear waves. The magnitude and speed of the oscillations of the VPS depend on the number of input pressures such that they will vary with the amplitude of the pulse wave and the number of pulses focused on the point. In certain embodiments, the imaging tool can focus on a point in the formation to create a VPS at that point, and then shift the focal point (i.e., the VPS) supersonically to induce a shear wave in the rock. The minute movements of the focal point can create a shear wave sufficient to vibrate the rock particles. The required movement of the focal point is dependent on at least one of the density of the rock, the speed of sound in the rock, the frequency of the transmitted acoustic wave, the amplitude of the transmitted acoustic wave, or the number of pulses of the transmitted acoustic wave.

The shear waves may be controlled (i.e., focus the wave energy up and down a fracture) such that when focused on a fracture zone, they can be used to open or close the fracture depending on the circumstances (e.g., to close a fracture to avoid infiltration of water to an oil zone, or to open a fracture to allow more oil to flow and improve production without fracturing using water, sand or other chemically-based fracturing agents).

In certain embodiments, system 100 can include up to 32 transmitters and receivers to create a virtual array within the formation, and the virtual array may be phased in the same way that a real array may be phased (i.e., time delays). The system 100 is not limited to 32 transmitters and receivers, as its modular design provides flexibility to work with a virtually unlimited number of transmitters and receivers. However, using a system with at least 32 transmitters and receivers, a focal point at a distance within range of the acoustic transmission from the tool 302 can create a VPS which can in turn trigger minute vibrations (i.e., resonance of formation particles at the location of a virtual point source) of the formation at that focal point and thereby create a shear wave which may be used to image the formation at a distance beyond the borehole containing the tool. Depending on the intensity of the focused beam and the density of the rock, the VPS becomes a new acoustic source which can be used to create acoustic waves that emanate outward from that point. The shear wave may be used to get the spectral properties of the formation by inducing resonance of the formation. Then elastography (elasticity imaging methods) can be utilized to determine the desired parameters or properties of the formation, including the elastic modulus, permeability, and/or porosity of the formation. As with conventional seismic wave reflection, a set of pressure pulses is returned from the focal point due to rock particle displacement. Other properties that can be determined include density and velocity of sound in the formation.

With respect to resonance, in some example methods the tool focuses a first portion of the first outbound acoustic energy at a first frequency on the location or volume of the VPS. The tool then focuses a second portion of the first outbound acoustic energy at a second frequency on the location or volume of the VPS. Based on the return acoustic energy from the VPS, the system (e.g., device 310) may determine the resonant frequency of the formation at the location or volume of the VPS. In some cases, two or more discrete frequencies are focused to the location or volume of the VPS, and the system determines the resonant frequency by eventually focusing outbound acoustic energy at the resonant frequency on the location or volume of the VPS. In other cases, and as alluded to above, the outbound acoustic energy may be a continuous tone that sweeps (either from higher to lower or vice-versa) a plurality of frequencies between a first frequency and a second frequency. Based on amplitude of the return acoustic energy the device 310 may determine the resonant frequency of the location or volume of the VPS (e.g., the sweep frequency producing higher return acoustic energy amplitude indicative of the resonant frequency). In other cases, the outbound acoustic energy may be in the form of one or more chirps or tapered chirps as discussed above, and again amplitude of the return acoustic energy may indicate resonant frequency of the location or volume of the VPS. In various embodiments, a plurality of transmitters and receivers can be used. Such transmitter and receivers can be either regularly or irregularly spaced. Specifically, various numbers of transmitters and receivers can be used to achieve desired image resolution at appreciable distances from the borehole. The number of transmitters does not necessarily need to match the number of receivers. In some examples, more transmitters than receivers can be used, and there could be unused transmitters on the tool. Alternatively, there could be unused receivers on the tool, such as when there are more receivers than transmitters. The configuration selected can depend on the timing of data acquisition geometry of the system, performance desired, imaging to be performed, among other variables. It is possible to acquire data with a single transmitter and a single receiver, but the use of more transmitters and receivers results in higher density data and better/higher resolution images. Another configuration for borehole imaging (i.e., wireline well logging, which is very different from seismic imaging) could include one transmitter and four receivers. In some cases where parametric imaging (described more fully below) is to be implemented, two transmitters could be used with one to four receivers.

However, beam steering (e.g., to create a VPS) requires an array of transmitters in order to phase (i.e., time delay) the waveforms being transmitted from each transmitter so that they focus at the desired point in the formation. The wave forms can be transmitted in a timed sequence (e.g., the first transmitter sends, then the second, then the third, etc.). However, the transmitters do not necessarily need to transmit in the order in which they are situated on the tool. It can be appropriate to transmit, for example, a waveform from the third transmitter, then the first, then the tenth, then the second, etc., depending on the goal and design of the imaging project.

Because the virtual sources are created in the formation remote from the borehole in which the imaging system 302 is located, it is not necessary to use range-gating/time-gating or redatuming in order to position the virtual sources at the location of the receivers. A virtual borehole can be created, at any selected distance from, and at any azimuth about, the axis of the borehole containing the system. Using the virtual borehole, 3D imaging remote from a single borehole can be achieved, without requiring two separate boreholes to achieve imagery remote from one of the boreholes (i.e., such as that previously associated with cross-borehole tomography), to thus achieve "virtual" cross-borehole tomography.

Because the system is positioned down-hole in the borehole and, by choice, closer to the formation of interest and below any overburden, acquisition issues related to imaging through complex overburden are eliminated. The received waves from the virtual sources result in real traces collected by the receivers, therefore many standard seismic approaches for image reconstruction and analysis (e.g., Kirchhoff migration) can be utilized. It is not necessary to interpolate, convolve or cross-correlate the traces to create new virtual traces in order to improve image resolution, as all of the traces are real. In other words, we have real data points for everything we want to reconstruct in the image. High resolution imaging with this tool and the application of VPS's is possible without having to interpolate, convolve, or cross-correlate traces, or use synthetic traces, to improve the resolution of the imagery.

Nevertheless, the system 100 may be used in actual cross-borehole tomography, but with better results than conventional cross-borehole tomography. That is, the tool 100 in a first borehole may create virtual point sources between the first borehole and second borehole spaced apart from the first borehole. The virtual point sources may be created in a plane in which both boreholes resides (e.g., directly between the two boreholes). However, virtual point sources may also be created at locations or volumes on either side of the plane in which both boreholes reside, and may also be created on the far side of the second borehole (e.g., created at locations or volumes that are not between the two boreholes). Thus, in example embodiments the outbound acoustic energy may be focused on location or volume in relation to a second borehole, and the return acoustic energy can be send by sensors disposed in the second borehole spaced apart from the first borehole.

Further still, while there may be many advantages to created virtual point sources within a formation surrounding a first borehole, and likewise sensing return acoustic energy either in the first borehole or a second borehole spaced apart from the first borehole, in yet still other example embodiments the return acoustic energy created by a virtual point source may be sensed by seismic sensors disposed at the surface of the Earth.

Imaging embodiments include one or more real traces which are acquired as real data. The algorithm used for these purposes can be similar to the algorithm disclosed in U.S. Pat. No. 7,819,805, FIGS. 20-21, to Davies, et al, which is incorporated herein by reference in its entirety. Instead of storing and processing each page of data (as disclosed in the Davies patent), other embodiments can store and process each pixel directly. The image reconstruction algorithm can be based on geometry. In this context, the algorithms can be more efficient computationally, except that every pixel can be processed, which arguably adds computational expense, but which can be mitigated by the number of (and choice of) processors. Other image reconstruction algorithms can be simplified due to less of a need to use range-gating/time-gating, redatuming, interpolation, convolution and/or cross-correlation.

Consequently, the formation can be more accurately and realistically imaged, and only one well is needed to image the formation where normally, multiple wells would be required to image the formation. The spectral properties of the formation can be obtained by inducing resonance in the formation. By inducing resonance, we can apply the concepts of elastography (elasticity measurement and imaging methods) using the shear waves (i.e., an external mechanical force) created by the induced resonance in the rock at a desired location.

Embodiments of the system 100 can utilize any of a wide variety of transducers. However, a brief discussion of certain transducer aspects warrants discussion. Acoustic interrogation of subsurface rock formations for imaging and characterization of subsurface features face challenges related to the size and power of the acoustic sources, the speed and fidelity of data transmission through the wireline cable, and the depth of signal penetration into the formation. High frequency energy waves typically generated using small transducers do not penetrate very deeply into the formation, while low frequency energy waves typically generated by much larger transducers do penetrate deeply into the formation.

In addition, high-frequency transmitters are generally smaller than low-frequency transmitters and therefore, they fit into smaller diameter boreholes more easily. Consequently, parametric imaging can be used to create low frequency waves so that the transducers fit more conveniently into small diameter tool bodies. Parametric imaging can include two or more high frequency signals focused at a point in the formation such that the difference between the two frequencies is a low frequency. For example, F1=70 kHz, F2=71 kHz, and F2−F1=F3 of 1 kHz. The resulting low frequency signal can penetrate deeper into the formation than high frequency signals. Parametric imaging is just one method of creating lower-frequency acoustic waves that the system 100 can implement, but is not required for creating a virtual point source. In some cases, focusing outbound acoustic energy may involve having each transmit or send a signal having two or more distinct frequencies, and wherein a beat frequency as between the two distinct frequencies is less than 1000 Hertz. In yet still other cases, each transmitter or acoustic source may send outbound acoustic energy having a single frequency, but different acoustic sources may send outbound acoustic energy having different frequencies. Thus, a first plurality of acoustic sources may send signals having a first frequency, and simultaneously a scone plurality of acoustic sources may send signal having a second frequency different than the first frequency, such that a beat frequency as between the first and second frequency is less than 1000 Hz.

Embodiments of transducers disclosed herein can include a unipole transducer. The unipole transducer sends out a signal only in a single direction. The transmitters disclosed herein do not necessarily have or need a waveguide as they can be designed to function as a unipole transmitter with the wave being propagated in a single direction only.

Embodiments of the system 100 disclosed herein have great flexibility and adaptability to different types of wellbores such as horizontal, deviated, cased, and open-hole. This stands in contrast to many existing downhole imaging tools, which are inflexible and not adaptable to different types of wellbores. Such existing tools are either permanently configured to acquire data in a specific manner, or they are configured for each use prior to being lowered into the borehole.

Taking into account all of the foregoing, the following embodiments are contemplated, and including combinations thereof.

(1) One example embodiment is a method of reducing water consumption in a fracturing operation, comprising: imaging a geologic formation surrounding a borehole using a downhole tool within the borehole, the imaging along an axial length of the borehole within the geologic formation, and the imaging creates an image indicative of natural fractures within the geologic formation; identifying, within the image, fractures conducive to hydrocarbon production; correlating the fractures conducive to hydrocarbon production to fracture zones along the axial length, wherein each fracture zone spans a portion of the axial length, and collectively the fracture zones are less than the axial length; and identifying locations of the fracture zones to be hydraulically fractured, thereby reducing water consumption compared to hydraulic fracturing along an entirety of the axial length of the borehole within the geologic formation.

(2) In some embodiments of (1), the step of identifying locations of the fracture zones to be hydraulically fractured is by way of a computer interface device.

(3) In some embodiments of (1) or (2), the method further comprises hydraulic fracturing of the fracture zones, and refraining from hydraulic fracturing at least some remaining zones outside the fracture zones.

(4) In some embodiments of (3), the hydraulic fracturing is only within the fracture zones.

(5) In some embodiments of any one of (1) to (4), imaging the geologic formation is such that the image indicative of natural fractures includes information indicative of azimuthal directions of the fractures conducive to hydrocarbon production, the azimuthal directions being relative to the axial length of the borehole; identifying within the image fractures conducive to hydrocarbon production further comprises identifying azimuthal directions of the fractures conducive to hydrocarbon production; correlating the fractures conducive to hydrocarbon production further comprises, within each fracture zone, defining a fracturing direction based on an azimuthal direction of the fractures conducive to hydrocarbon production; and identifying locations of the fracture zones to be hydraulically fractured further comprises an indication of the fracturing direction within each fracture zone, thereby reducing water consumption compared to hydraulic fracturing in all azimuthal directions within the fracture zone.

(6) In some embodiments of (5), the method further comprises hydraulic fracturing, within each fracture zone, in the fracturing direction and refraining from hydraulic fracturing in at least some remaining directions.

(7) In some embodiments of any one of (1) to (6), imaging the geologic formation further comprises: creating a plurality of virtual boreholes within the geologic formation surrounding the borehole; sensing parameters of the geologic formation between each virtual borehole and the borehole, the sensing being by the downhole tool within the borehole; and creating the image indicative of natural fractures from the parameters of the geologic formation between each virtual borehole and the borehole.

(8) In some embodiments of (7), creating the plurality of virtual boreholes comprises, for each virtual borehole, inducing a plurality of virtual point sources along a line, the line being offset from the borehole, and the inducing being by the downhole tool within the borehole.

(9) In some embodiments of (8), the line for inducing the plurality of virtual point sources is parallel to the borehole.

(10) In some embodiments of (8) or (9), inducing the plurality of virtual point sources further comprises, for each virtual point source, focusing acoustic energy on a volume within the geologic formation, the volume spaced away from the borehole, and the focusing creates an acoustic source within the volume.

(11) In some embodiments of any one of (1) to (10), identifying fractures conducive to hydrocarbon production comprises identifying fractures with prominent directions parallel to the borehole.

(12) In some embodiments of any one of (1) to (11), identifying fractures conducive to hydrocarbon production comprises identifying clusters of fractures with prominent directions parallel to the borehole.

(13) In some embodiments of any one of (1) to (12), further comprise: identifying, within the image, fractures that are non-conducive to hydrocarbon production; and correlating the fractures that are non-conducive to hydrocarbon production to non-fracture zones, where each non-fracture zone spans a portion of the axial length, and collectively the non-fracture zones are less than the axial length.

(14) In some embodiments of any one of (1) to (13), imaging the geologic formation further comprises: focusing a first outbound acoustic energy, launched from the downhole tool within the axial length of the borehole within the geologic formation, on a volume within the geologic formation spaced away from the borehole, the focusing creates a first virtual point source that creates a first return acoustic energy; receiving the first return acoustic energy from the first virtual point source at a plurality of seismic sensors of the downhole tool; and creating the image based on the first return acoustic energy.

(15) In some embodiments of (14), focusing the first outbound acoustic energy comprises creating the first outbound acoustic energy from an array of acoustic sources spaced along the downhole tool, the array of acoustic sources activated as a phased array to focus the first outbound acoustic energy on the first virtual point source.

(16) In some embodiments of (15), focusing the first outbound acoustic energy comprises sending, from each acoustic source in the array of acoustic sources, a signal having two distinct frequencies, and wherein a beat frequency as between the two distinct frequencies is less than 1000 Hertz.

(17) In some embodiments of (15), focusing the first outbound acoustic energy comprises: sending, from a first plurality of sources of the array of acoustic sources spaced along the downhole tool, signals having a first frequency; and simultaneously sending, from a second plurality of sources of the array of acoustic sources spaced along the downhole tool, signals having a second frequency different than the first frequency; wherein a beat frequency as between the first and second frequencies is less than 1000 Hertz.

(18) In some embodiments of any one of (1) to (17), the geologic formation is a shale formation.

(19) Another example embodiment is a method of reducing water consumption for fracturing a geologic formation surrounding a borehole, the method comprising: imaging, using a downhole tool within the borehole, the geologic formation surrounding the borehole to obtain imagery of the geologic formation along a certain extent of the borehole; analyzing the imagery to identify certain zones based on features in the geologic formation revealed by the imagery, the analyzing of the imagery results in identified zones; identifying natural fractures in the geologic formation within the identified zones, the identifying results in identified fractures; selecting regions in the borehole based upon the identified fractures to create selected regions, wherein the selected regions collectively represent less than the certain extent of the borehole; and determining one or more individual fracturing locations corresponding to each selected region, so that fracturing the borehole at each respective fracturing location, without fracturing elsewhere along the certain extent of the borehole, results in fracturing only the selected regions of the borehole, thereby reducing water consumption during fracturing operation.

(20) In some embodiments of (19), at least some of the individual fracturing locations are not continuous with each other in the borehole, so that at least two of the individual fracturing locations are axially spaced apart from each other relative to an axis of the borehole.

(21) In some embodiments of (19) or (20), imaging the geologic formation surrounding the borehole comprises: creating a plurality of virtual boreholes within the geologic formation surrounding the borehole; sensing parameters of the geologic formation between each virtual borehole and the borehole, the sensing being by the downhole tool within the borehole; and creating the imagery of the geologic formation from parameters of the geologic formation between each virtual borehole and the borehole.

(22) In some embodiments of (21), creating the plurality of virtual boreholes comprises, for each virtual borehole, inducing a plurality of virtual point sources along a line, the line being offset from the borehole, and the inducing being by the downhole tool within the borehole.

(23) In some embodiments of (22), the line for inducing the plurality of virtual point sources is parallel to the borehole.

(24) In some embodiments of (22) or (23), inducing the plurality of virtual point sources further comprises, for each virtual point source, focusing an outbound acoustic energy launched from the downhole tool on a volume within the geologic formation spaced away from the borehole, and the focusing creates a first virtual point source that creates a return acoustic energy.

(25) In some embodiments of (24), focusing the outbound acoustic energy comprises creating the outbound acoustic energy from an array of acoustic sources spaced along the downhole tool, the array of acoustic sources activated as a phased array to focus the outbound acoustic energy on the volume.

(26) In some embodiments of (25), focusing the outbound acoustic energy comprises sending, from each acoustic source in the array of acoustic sources, a signal having two distinct frequencies, and wherein a beat frequency as between the two distinct frequencies is less than 1000 Hertz.

(27) In some embodiments of (25), focusing the outbound acoustic energy comprises: sending, from a first plurality of sources of the array of acoustic sources spaced long the downhole tool, signals having a first frequency; and simultaneously sending, from a second plurality of sources of the array of acoustic sources spaced long the downhole tool, signals having a second frequency different than the first frequency; wherein a beat frequency as between the first and second frequencies is less than 1000 Hertz.

(28) In some embodiments of any one of (19) to (27), identifying natural fractures in the geologic formation comprises one or more of: identifying natural fractures conducive to hydrocarbon production; identifying azimuthal directions of the fractures; identifying fractures with prominent directions parallel to the borehole; and identifying clusters of fractures with prominent directions parallel to the borehole.

(29) In some embodiments of any one of (19) to (28), the geologic formation is a shale formation.

(30) Another example embodiment is a method of fracturing a hydrocarbon deposit, comprising: imaging a geologic formation surrounding a borehole using a downhole tool within the borehole, the imaging along an axial length of the borehole within the geologic formation, and the imaging creates an image indicative of natural fractures within the geologic formation; identifying, within the image, fractures conducive to hydrocarbon production; correlating the fractures conducive to hydrocarbon production to fracture zones along the axial length, wherein each fracture zone spans a portion of the axial length, and collectively the fracture zones are less than the axial length; and hydraulic fracturing one or more of the fracture zones and refraining from hydraulic fracturing at least some remaining zones outside the fracture zones.

(31) In some embodiments of (30), hydraulic fracturing is only within the fracture zones.

(32) In some embodiments of (31), imaging the geologic formation surrounding the borehole comprises: creating a plurality of virtual boreholes within the geologic formation surrounding the borehole; sensing parameters of the geologic formation between each virtual borehole and the borehole, the sensing being by the downhole tool within the borehole; and creating the imagery of the geologic formation from parameters of the geologic formation between each virtual borehole and the borehole.

(33) In some embodiments of (32), creating the plurality of virtual boreholes comprises, for each virtual borehole, inducing a plurality of virtual point sources along a line, the line being offset from the borehole, and the inducing being by the downhole tool within the borehole.

(34) In some embodiments of (33), the line for inducing the plurality of virtual point sources is parallel to the borehole.

(35) In some embodiments of (33) or (34), inducing the plurality of virtual point sources further comprises, for each virtual point source, focusing an outbound acoustic energy launched from the downhole tool on a volume within the geologic formation spaced away from the borehole, and the focusing creates a first virtual point source that creates a return acoustic energy.

(36) In some embodiments of (35), focusing the outbound acoustic energy comprises creating the outbound acoustic energy from an array of acoustic sources spaced along the downhole tool, the array of acoustic sources activated as a phased array to focus the outbound acoustic energy on the volume.

(37) In some embodiments of (35), focusing the outbound acoustic energy comprises sending, from each acoustic source in the array of acoustic sources, a signal having two distinct frequencies, and wherein a beat frequency as between the two distinct frequencies is less than 1000 Hertz.

(38) In some embodiments of (36), focusing the outbound acoustic energy comprises: sending, from a first plurality of sources of the array of acoustic sources spaced long the downhole tool, signals having a first frequency; and simultaneously sending, from a second plurality of sources of the array of acoustic sources spaced long the downhole tool, signals having a second frequency different than the first frequency; wherein a beat frequency as between the first and second frequencies is less than 1000 Hertz.

(39) In some embodiments of any one of (30) to (38), identifying natural fractures in the geologic formation comprises one or more of: identifying natural fractures conducive to hydrocarbon production; identifying azimuthal directions of the fractures; identifying fractures with prominent directions parallel to the borehole; and identifying clusters of fractures with prominent directions parallel to the borehole.

(40) In some embodiments of any one of (30) to (38) the geologic formation is a shale formation.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Indeed, the description in the present application should not be read as implying that any particular element, step, or function is an essential or critical element that must be included in the claim scope. The scope of claimed subject matter is defined by the allowed claims.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges can include each and every value within that range. References to numerical values, whether stated in a range or standing alone, are intended to represent approximate values unless the context clearly requires otherwise.

The invention claimed is:

1. A method of reducing water consumption in a fracturing operation, comprising:
    imaging a geologic formation surrounding a borehole using a downhole tool within the borehole, the imaging along an axial length of the borehole within the geologic formation, and the imaging creates an image indicative of natural fractures within the geologic formation, wherein the imaging comprises focusing an outbound acoustic energy, launched from the downhole tool, on a volume within the geologic formation spaced away from the borehole, the focusing creating a virtual point source from which a return acoustic energy propagates, wherein the volume of the virtual point source experiences a pressure change due to constructive wave interference of acoustic waves at the volume, and receiving the return acoustic energy, wherein the focusing of the outbound acoustic energy creates the virtual point source using beamforming that emits the outbound acoustic energy from the downhole tool with controlled delays;
    identifying, within the image, fractures conducive to hydrocarbon production;
    correlating the fractures conducive to hydrocarbon production to fracture zones along the axial length, wherein each fracture zone spans a portion of the axial length, and collectively the fracture zones are less than the axial length; and
    identifying locations of the fracture zones to be hydraulically fractured, thereby reducing water consumption compared to hydraulic fracturing along an entirety of the axial length of the borehole within the geologic formation.

2. The method of claim 1, wherein the step of identifying locations of the fracture zones to be hydraulically fractured is by way of a computer interface device.

3. The method of claim 1 further comprising hydraulic fracturing of the fracture zones, and refraining from hydraulic fracturing at least some remaining zones outside the fracture zones.

4. The method of claim 1, wherein:
    imaging the geologic formation is such that the image indicative of natural fractures includes information indicative of azimuthal directions of the fractures conducive to hydrocarbon production, the azimuthal directions being relative to the axial length of the borehole;
    identifying within the image fractures conducive to hydrocarbon production further comprises identifying azimuthal directions of the fractures conducive to hydrocarbon production;
    correlating the fractures conducive to hydrocarbon production further comprises, within each fracture zone, defining a fracturing direction based on an azimuthal direction of the fractures conducive to hydrocarbon production; and
    identifying locations of the fracture zones to be hydraulically fractured further comprises an indication of the fracturing direction within each fracture zone, thereby reducing water consumption compared to hydraulic fracturing in all azimuthal directions within the fracture zone.

5. The method of claim 4, further comprising hydraulic fracturing, within each fracture zone, in the fracturing direction and refraining from hydraulic fracturing in at least some remaining directions.

6. The method of claim 1, wherein imaging the geologic formation further comprises:
creating a plurality of virtual boreholes within the geologic formation surrounding the borehole;
sensing parameters of the geologic formation between each virtual borehole and the borehole, the sensing being by the downhole tool within the borehole; and
creating the image indicative of natural fractures from the parameters of the geologic formation between each virtual borehole and the borehole.

7. The method of claim 6, wherein creating the plurality of virtual boreholes comprises, for each virtual borehole, inducing a plurality of virtual point sources along a line, the line being offset from the borehole, and the inducing being by the downhole tool within the borehole.

8. The method of claim 1, wherein identifying fractures conducive to hydrocarbon production comprises identifying fractures or clusters of fractures with prominent directions parallel to the borehole.

9. The method of claim 1, further comprising:
identifying, within the image, fractures that are non-conducive to hydrocarbon production; and
correlating the fractures that are non-conducive to hydrocarbon production to non-fracture zones, where each non-fracture zone spans a portion of the axial length, and collectively the nonfracture zones are less than the axial length.

10. The method of claim 1, wherein imaging the geologic formation further comprises:
receiving the return acoustic energy from the virtual point source at a plurality of seismic sensors of the downhole tool; and
creating the image based on the return acoustic energy.

11. The method of claim 1, wherein focusing the outbound acoustic energy comprises creating the outbound acoustic energy from an array of acoustic sources spaced along the downhole tool, the array of acoustic sources activated as a phased array to focus the outbound acoustic energy and create the virtual point source.

12. The method of claim 11, wherein focusing the outbound acoustic energy comprises:
sending, from each acoustic source in the array of acoustic sources, a signal having two distinct frequencies, and wherein a beat frequency as between the two distinct frequencies is less than 1000 Hertz; or
sending, from a first plurality of sources of the array of acoustic sources spaced along the downhole tool, signals having a first frequency; and simultaneously sending, from a second plurality of sources of the array of acoustic sources spaced along the downhole tool, signals having a second frequency different than the first frequency; wherein a beat frequency as between the first and second frequencies is less than 1000 Hertz.

13. The method of claim 1, wherein the downhole tool comprises a plurality of acoustic sources spaced along the downhole tool, and the controlled delays are based on distances between location of the virtual point source and the plurality of acoustic sources as well as formation sonic velocity.

14. A method of reducing water consumption for fracturing a geologic formation surrounding a borehole, the method comprising:
imaging, using a downhole tool within the borehole, the geologic formation surrounding the borehole to obtain imagery of the geologic formation along a certain extent of the borehole, wherein the imaging comprises focusing an outbound acoustic energy, launched from the downhole tool, on a volume within the geologic formation spaced away from the borehole, the focusing creating a virtual point source from which a return acoustic energy propagates, wherein the volume of the virtual point source experiences a pressure change due to constructive wave interference of acoustic waves at the volume, and receiving the return acoustic energy, wherein the focusing of the outbound acoustic energy creates the virtual point source using beamforming that emits the outbound acoustic energy from the downhole tool;
analyzing the imagery to identify certain zones based on features in the geologic formation revealed by the imagery, the analyzing of the imagery results in identified zones;
identifying natural fractures in the geologic formation within the identified zones, the identifying results in identified fractures;
selecting regions in the borehole based upon the identified fractures to create selected regions, wherein the selected regions collectively represent less than the certain extent of the borehole; and
determining one or more individual fracturing locations corresponding to each selected region, so that fracturing the borehole at each respective fracturing location, without fracturing elsewhere along the certain extent of the borehole, results in fracturing only the selected regions of the borehole, thereby reducing water consumption during fracturing operation.

15. A method of fracturing a hydrocarbon deposit, comprising:
imaging a geologic formation surrounding a borehole using a downhole tool within the borehole, the imaging along an axial length of the borehole within the geologic formation, and the imaging creates an image indicative of natural fractures within the geologic formation, wherein the imaging comprises focusing an outbound acoustic energy, launched from the downhole tool, on a volume within the geologic formation spaced away from the borehole, and the focusing creates a virtual point source from which a return acoustic energy propagates, wherein the volume of the virtual point source experiences a pressure change due to constructive wave interference of acoustic waves at the volume, and receiving the return acoustic energy, wherein the focusing of the outbound acoustic energy creates the virtual point source using beamforming that emits the outbound acoustic energy from the downhole tool;
identifying, within the image, fractures conducive to hydrocarbon production;
correlating the fractures conducive to hydrocarbon production to fracture zones along the axial length, wherein each fracture zone spans a portion of the axial length, and collectively the fracture zones are less than the axial length; and
hydraulic fracturing one or more of the fracture zones and refraining from hydraulic fracturing at least some remaining zones outside the fracture zones.

16. The method of claim 15, wherein imaging the geologic formation surrounding the borehole comprises:
creating a plurality of virtual boreholes within the geologic formation surrounding the borehole;
sensing parameters of the geologic formation between each virtual borehole and the borehole, the sensing being by the downhole tool within the borehole; and creating the imagery of the geologic formation from parameters of the geologic formation between each virtual borehole and the borehole.

17. The method of claim 16, wherein creating the plurality of virtual boreholes comprises, for each virtual borehole, inducing a plurality of virtual point sources along a line, the line being offset from the borehole, and the inducing being by the downhole tool within the borehole.

18. The method of claim 15, wherein focusing the outbound acoustic energy comprises creating the outbound acoustic energy from an array of acoustic sources spaced along the downhole tool, the array of acoustic sources activated as a phased array to focus the outbound acoustic energy on the volume.

19. The method of claim 18, wherein focusing the outbound acoustic energy comprises:

sending, from each acoustic source in the array of acoustic sources, a signal having two distinct frequencies, and wherein a beat frequency as between the two distinct frequencies is less than 1000 Hertz; or sending, from a first plurality of sources of the array of acoustic sources spaced long the downhole tool, signals having a first frequency; and simultaneously sending, from a second plurality of sources of the array of acoustic sources spaced long the downhole tool, signals having a second frequency different than the first frequency; wherein a beat frequency as between the first and second frequencies is less than 1000 Hertz.

20. The method of claim 15, wherein identifying natural fractures in the geologic formation comprises one or more of: identifying natural fractures conducive to hydrocarbon production; identifying azimuthal directions of the fractures; identifying fractures with prominent directions parallel to the borehole; and identifying clusters of fractures with prominent directions parallel to the borehole.

* * * * *